US007254807B2

(12) United States Patent
Sakata et al.

(10) Patent No.: US 7,254,807 B2
(45) Date of Patent: Aug. 7, 2007

(54) PROGRAM CONVERSION APPARATUS, PROGRAM CONVERSION METHOD, AND COMPUTER PROGRAM FOR EXECUTING PROGRAM CONVERSION PROCESS

(75) Inventors: Toshiyuki Sakata, Osaka (JP); Taketo Heishi, Osaka (JP); Hajime Ogawa, Suita (JP); Shohei Michimoto, Takatsuki (JP); Shuichi Takayama, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 686 days.

(21) Appl. No.: 10/315,877

(22) Filed: Dec. 10, 2002

(65) Prior Publication Data

US 2003/0135849 A1 Jul. 17, 2003

(30) Foreign Application Priority Data

Dec. 11, 2001 (JP) ............................. 2001-377886

(51) Int. Cl.
*G06F 9/45* (2006.01)
(52) U.S. Cl. ...................................... 717/136; 717/140
(58) Field of Classification Search ................ 717/136, 717/154, 140–141; 712/20–26, 204–208
See application file for complete search history.

(56) References Cited

U.S. PATENT DOCUMENTS

| 4,325,120 | A | * | 4/1982 | Colley et al. ................ 711/202 |
| 5,394,529 | A | * | 2/1995 | Brown et al. ................ 712/240 |
| 5,481,689 | A | * | 1/1996 | Stamm et al. ............... 711/202 |
| 5,507,030 | A | * | 4/1996 | Sites .......................... 717/136 |
| 5,511,173 | A | * | 4/1996 | Yamaura et al. ............. 712/248 |
| 5,644,769 | A | * | 7/1997 | Hasiguti ...................... 717/154 |
| 5,809,320 | A | * | 9/1998 | Jain et al. ...................... 712/34 |
| 6,243,864 | B1 | * | 6/2001 | Odani et al. ................. 717/154 |
| 6,308,323 | B1 | * | 10/2001 | Douniwa ..................... 717/154 |
| 6,425,069 | B1 | * | 7/2002 | Thatcher et al. .............. 712/24 |
| 6,484,312 | B1 | * | 11/2002 | Morrison ..................... 717/146 |
| 6,654,877 | B1 | * | 11/2003 | Huck et al. .................. 712/229 |
| 6,745,320 | B1 | * | 6/2004 | Mitsuishi ..................... 712/225 |
| 2002/0174327 | A1 | * | 11/2002 | Kruckemyer et al. ....... 712/234 |

FOREIGN PATENT DOCUMENTS

JP 11-338710 12/1999

OTHER PUBLICATIONS

Pradip Bose, et al. "Systematically Derived Instruction Sets For High-Level Language Support", Aril 1982, ACM Press, pp. 73-84.*

* cited by examiner

*Primary Examiner*—Wei Zhen
*Assistant Examiner*—Anna Deng

(57) ABSTRACT

A compiling unit (110) generates indefinite branch information showing that an instruction set to be selected is indefinite, instead of generating a branch instruction. A linking unit (130) generates an appropriate direct addressing branch instruction by judging whether an instruction set used at a branch source and an instruction set used at a branch destination are the same. Also, one reference instruction set is determined. The compiling unit (110) adds a mode adjusting instruction that belongs to the reference instruction set and that is for causing a branch to an instruction placed at a branch destination and for selecting the instruction set that is originally to be selected. The mode adjusting instruction provides an alternative branch destination corresponding to an original branch destination, and the compiling unit (110) generates an indirect addressing branch instruction for causing a branch to the alternative branch destination and for selecting the reference instruction set.

20 Claims, 17 Drawing Sheets

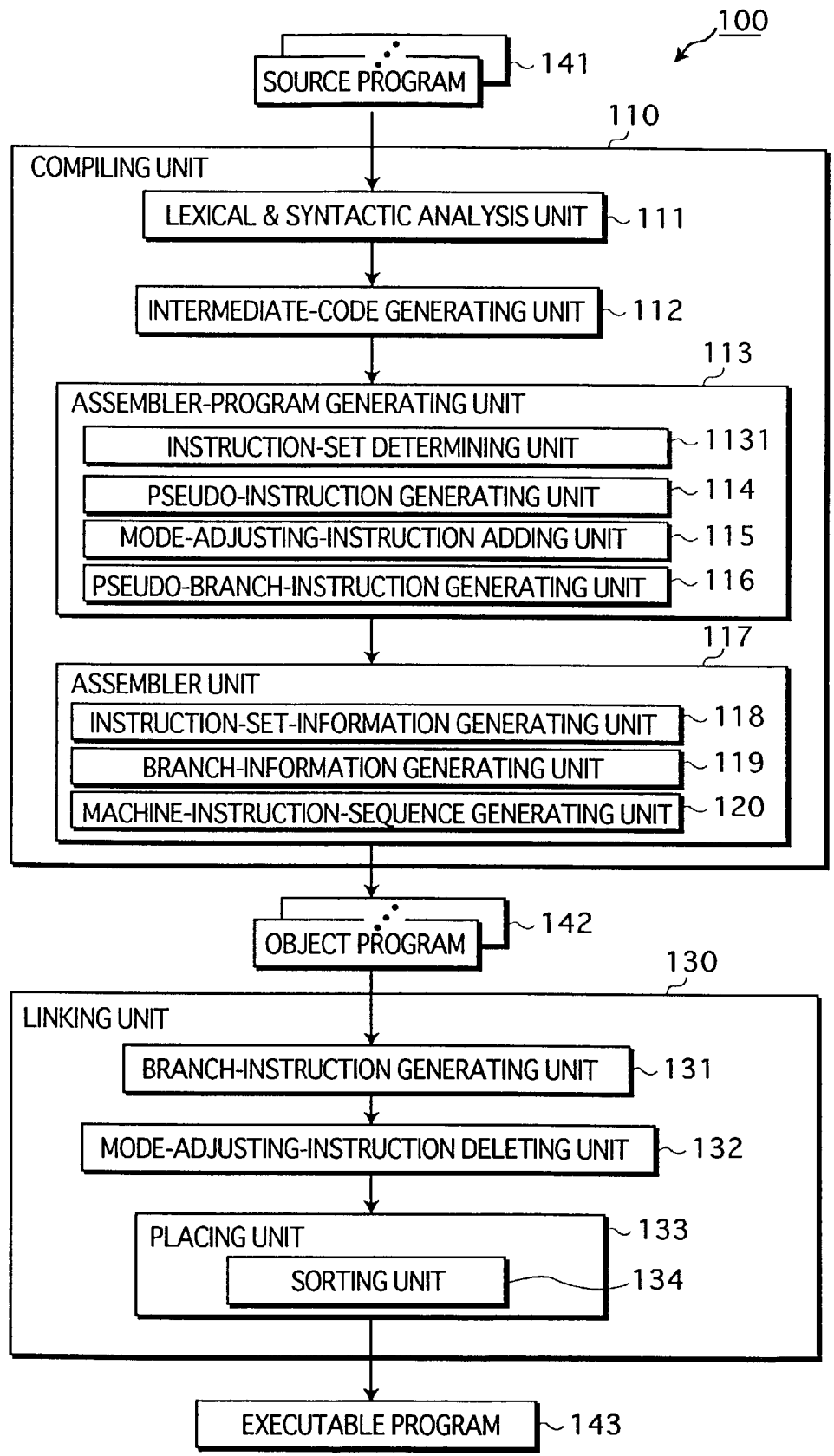

FIG.2

| PSEUDO INSTRUCTION 151 | OPERAND 152 | MEANING 153 | ASSEMBLER OPERATION 154 |
|---|---|---|---|
| INSTRUCTION-SET-INDICATING PSEUDO INSTRUCTION: INSTMODE | INSTRUCTION SET | FOLLOWING INSTRUCTION BELONGS TO DESIGNATED INSTRUCTION SET | INSTRUCTION SET INFORMATION IS GENERATED, AND MACHINE INSTRUCTION BELONGING TO DESIGNATED INSTRUCTION SET IS GENERATED FOR FOLLOWING INSTRUCTION |
| PSEUDO BRANCH INSTRUCTION: brx | ADDRESS | INSTRUCTION SET USED AT BRANCH DESTINATION IS INDEFINITE AT COMPILING, AND "br" INSTRUCTION OR "brc" INSTRUCTION IS GENERATED AT LINKING | INDEFINITE BRANCH INFORMATION IS GENERATED |
| callx | ADDRESS | INSTRUCTION SET USED AT BRANCH DESTINATION IS INDEFINITE AT COMPILING, AND "call" INSTRUCTION OR "callc" INSTRUCTION IS GENERATED AT LINKING | INDEFINITE BRANCH INFORMATION IS GENERATED |

| MACHINE INSTRUCTION SEQUENCE | ~250 |
| SYMBOL TABLE | ~260 |
| INSTRUCTION SET INFORMATION TABLE | ~270 |
| INDEFINITE BRANCH INFORMATION TABLE | ~280 |

142

260

| SYMBOL | CLASSIFICAITON | ADDRESS |
|---|---|---|
| _f | DEFINITION | 0000 |
| _0f | DEFINITION | 0000 |
| _0g | REFERENCE | 0010 |
| _g | REFERENCE | 0020 |

261  262  263

270

| SYMBOL | INSTRUCTION SET |
|---|---|
| _0f | HD |

271  272

280

| PSEUDO BRANCH INSTRUCTION | ADDRESS |
|---|---|
| callx | 0010 |

```
#pragma    _func_mode_HD
void       f() {
              ⋮
              g();
}
```

FIG.11B

```
#pragma    _func_mode_HS
void       g() {
              ⋮
}
```

FIG.13

| INSTRUCTION 291 | OPERAND 292 | FEATURE 293 |
|---|---|---|
| brc | ADDRESS AND INSTRUCTION SET | BRANCH TO BRANCH DESTINATION SHOWN BY ADDRESS IS CAUSED, INSTRUCTION SET IS SELECTED, AND INSTRUCTIONS FOLLOWING BRANCH DESTINATION ARE EXECUTED |
| jmpc | REGISTER AND INSTRUCTION SET | BRANCH TO BRANCH DESTINATION SHOWN BY CONTENTS OF REGISTER IS CAUSED, INSTRUCTION SET IS SELECTED, AND INSTRUCTIONS FOLLOWING BRANCH DESTINATION ARE EXECUTED |
| callc | ADDRESS OR REGISTER, AND INSTRUCTION SET | RETURN ADDRESS AND CURRENTLY SELECTED INSTRUCTION SET ARE PUSHED ONTO STACK, BRANCH TO BRANCH DESTINATION SHOWN BY ADDRESS OR BY CONTENTS OF REGISTER IS CAUSED, INSTRUCTION SET IS SELECTED, AND INSTRUCTIONS FOLLOWING BRANCH DESTINATION ARE EXECUTED |

FIG.14A

```
_f
_0f        INSTMODE    MODE1    ⎫
            ⋮                    ⎪
           callx       _0g       ⎬  MODE1 INSTRUCTION
            ⋮                    ⎪
           mov         R0,_g     ⎪
           call        R0        ⎪
            ⋮                    ⎪
           ret                   ⎭
```

FIG.14B

```
_f         INSTMODE    MODE1         ⎫ MODE1 INSTRUCTION
           brc         _0f, MODEn    ⎭
_0f        INSTMODE    MODEn    ⎫
            ⋮                    ⎪
           callx       _0g       ⎪
            ⋮                    ⎬  MODEn INSTRUCTION
           mov         R0,_g     ⎪
           call        R0,MODE1  ⎪
            ⋮                    ⎪
           ret                   ⎭
```

FIG.15A

```
#pragma   _func_mode_HD
void      f() {
          void(*func)();
          ⋮
          g();
          ⋮
          func=&g;
          (*func)();
          ⋮
}
```

FIG.15B

```
#pragma   _func_mode_HS
void      g() {
          ⋮
}
```

FIG.16

| INSTRUCTION | OPERAND | FEATURE |
|---|---|---|
| br | ADDRESS | BRANCH TO BRANCH DESTINATION SHOWN BY ADDRESS IS CAUSED |
| brc | ADDRESS | BRANCH TO BRANCH DESTINATION SHOWN BY ADDRESS IS CAUSED, CURRENTLY SELECTED INSTRUCTION SET IS CHANGED, AND INSTRUCTIONS FOLLOWING BRANCH DESTINATION ARE EXECUTED |
| jmp | REGISTER | BRANCH TO BRANCH DESTINATION SHOWN BY CONTENTS OF REGISTER IS CAUSED |
| jmp | REGISTER | BRANCH TO BRANCH DESTINATION SHOWN BY CONTENTS OF REGISTER IS CAUSED, CURRENTLY SELECTED INSTRUCTION SET IS CHANGED, AND INSTRUCTIONS FOLLOWING BRANCH DESTINATION ARE EXECUTED |
| call | ADDRESS OR REGISTER | RETURN ADDRESS AND CURRENTLY SELECTED INSTRUCTION SET ARE PUSHED ONTO STACK, AND BRANCH TO BRANCH DESTINATION SHOWN BY ADDRESS OR BY CONTENTS OF REGISTER IS CAUSED |
| callc | ADDRESS OR REGISTER | RETURN ADDRESS AND CURRENTLY SELECTED INSTRUCTION SET ARE PUSHED ONTO STACK, AND BRANCH TO BRANCH DESTINATION SHOWN BY ADDRESS OR BY CONTENTS OF REGISTER IS CAUSED, CURRENTLY SELECTED INSTRUCTION SET IS CHANGED, AND INSTRUCTIONS FOLLOWING BRANCH DESTINATION ARE EXECUTED |
| ret | NONE | RETURN ADDRESS AND CURRENTLY SELECTED INSTRUCTION SET ARE POPPED FROM STACK, AND BRANCH TO POPPED RETURN ADDRESS IS CAUSED, POPPED INSTRUCTION SET IS SELECTED, AND INSTRUCTIONS FOLLOWING BRANCH DESTINATION ARE EXECUTED |

FIG.17A

```
_0f      :
         callc      _0g
         :
         mov        R0,_0g       } HD INSTRUCTION
         callc      R0
         :
         ret
```

FIG.17B

```
_0g      :                       } HS INSTRUCTION
         ret
```

PROGRAM CONVERSION APPARATUS, PROGRAM CONVERSION METHOD, AND COMPUTER PROGRAM FOR EXECUTING PROGRAM CONVERSION PROCESS

BACKGROUND OF THE INVENTION (1) Field of the Invention

The present invention relates to a program conversion apparatus and a program conversion method, and in particular to a technique for generating a program by selectively using a plurality of instruction sets.

(2) Description of the Related Art

Processors that have been conventionally commercialized select one of a plurality of instruction sets dynamically, by executing a particular branch instruction, and interpret and execute machine instructions according to the selected instruction set.

As one example of such, there is a processor that dynamically selects one of an HD (High-Density) instruction set and an HS (High-Speed) instruction set, and operates according to the selected instruction set. An HD instruction set is composed of machine instructions that can be aligned on the byte boundary. An HS instruction set is composed of machine instructions that can be aligned only on the word boundary.

Due to the different alignment boundary, an HS instruction occupies a larger code size than an equivalent HD instruction, whereas an HS instruction is executed at higher speed than an equivalent HD instruction.

Taking advantage of such characteristics of both the instructions, a program can be generated by using an HS instruction for a program part that occupies relatively a small code size with respect to the entire program and that is executed with high frequency, and using an HD instruction for the other program part, and can be executed by the processor. By doing so, the program size can be prevented from increasing, and the execution time can be shortened.

FIGS. 15A and 15B show examples of source programs described by taking advantage of such characteristics of the instructions. These source programs are described in C language. A pragma directive "#pragma_func_mode_XX (XX is HD or HS)" described in each of these source programs directs a compiler according to a conventional technique to compile the source program described to follow this directive into a machine instruction sequence that belongs to an XX (XX is HD or HS) instruction set. It is assumed here that such a pragma directive is provided for every function. Based on the pragma directive, a function "f" is compiled into an HD instruction sequence, and a function "g" is compiled into an HS instruction sequence.

Hereafter, the processor that is in a state where an HD instruction is being selected is referred to as the processor being in an operation mode of an "HD mode", and the processor that is in a state where an HS instruction is being selected is referred to as the processor being in an operation mode of an "HS mode". Also, a function that is to be compiled into an HD instruction sequence is referred to as an "HD function", and a function that is to be compiled into an HS instruction sequence is referred to as an "HS function". The particular branch instruction mentioned above is an instruction for causing a branch with mode change, and is hereafter referred to a "branch-with-mode-change instruction".

FIG. 16 shows examples of branch instructions. An "instruction" field 351 stores a mnemonic that represents a branch instruction, an "operand" field 352 stores an operand that can be included in the branch instruction, and a "feature" field 353 stores a feature of the branch instruction. These branch instructions can be included in an HD instruction set and in an HS instruction set.

As shown in the "feature" field 353, the operation mode of the processor (i.e., the instruction set currently selected by the processor) is changed when "brc", "jmpc", "callc", and "ret" instructions are executed. The operation mode of the processor is maintained when "jmp", and "call" instructions are executed.

FIGS. 17A and 17B show assembler programs that the conventional compiler generates for the source programs shown in FIGS. 15A and 15B. As is well known, the conventional compiler generates, in addition to machine instruction sequences represented by the assembler programs, symbol information (not shown) about a label that allows external reference.

The following is a supplemental explanation on the assembly program shown in FIG. 17A. The conventional compiler judges, for a function call "g( );" and a function call "func=&g; (*func) ( );" described in the function "f" shown in FIG. 15A, whether an instruction set of the caller function "f" and an instruction set of the callee function "g" are the same or not, based on the pragma directive described in each of the source programs. Then, the compiler judges that the instruction sets are not the same, and compiles the function call "g( );" into an instruction for a subroutine call with mode change "callc_0g" that is for causing a branch using direct addressing and for changing the operation mode of the processor, and compiles the function call "func=&g; (*func) ( );" into an instruction for a subroutine call with mode change "callc R0" that is for causing a branch using indirect addressing and for changing the operation mode of the processor. Hereafter, an instruction for a subroutine call with mode change is referred to as a "mode-changing subroutine call instruction".

On the other hand, if judging that the instruction set of the caller function and the instruction set of the callee function are the same, the compiler compiles each of those function calls into an instruction for a subroutine call instruction "call" that maintains the operation mode of the processor.

A linkage editor (or simply a "linker") according to a conventional technique links the object programs shown in FIGS. 17A and 17B, to generate an executable program (not shown) that is executable by the processor.

In this way, a compiler conventionally judges whether to generate a subroutine call instruction for maintaining the operation mode or a mode-changing subroutine call instruction for changing the operation mode. According to the judgment result, the compiler selectively generates one of a "call" instruction and a "callc" instruction.

However, as one disadvantage, a compiler and a linker according to the conventional technique cannot judge which one of a "call" instruction and a "callc" instruction is to be generated for a function call, until an instruction set of its caller function and an instruction set of its callee function are definite, and accordingly, cannot compile the function call until then.

Also, as another disadvantage, when a source program including a callee function is recompiled and consequently an instruction set of the callee function is changed, a "call" instruction that has already been generated for a function call to call the callee function needs to be changed to a "callc" instruction, and vice versa. This means that a source program that includes the function call procedure also needs to be recompiled.

The first problem therefore is that software development efficiency may be degraded by the disadvantages explained above.

Further, for a branch instruction using indirect addressing, its branch destination may differ every time when the branch is executed. The second problem therefore is that a subroutine call instruction using indirect addressing inherently may not function correctly, regardless of whether a "call" instruction or a "callc" instruction is generated.

These problems are not limited to such a function call as explained above, but may also occur in a typical branch to a label that allows external reference.

SUMMARY OF THE INVENTION

The present invention has been made to resolve the above problems. A first object of the present invention is to provide a program conversion apparatus composed of a compiler and a linker that can compile a source program including a branch source at the time when an instruction set of a branch destination is indefinite, and that is not required to recompile a source program including a branch procedure even when an instruction set of its branch destination is changed.

Also, a second object of the present invention is to provide a program conversion apparatus for generating an executable program that includes a branch instruction using indirect addressing and that functions correctly.

(1) The program conversion apparatus of the present invention is an apparatus targeting a processor that dynamically selects one of a plurality of instruction sets by executing a branch-with-mode-change instruction and interprets and executes a machine instruction according to the selected instruction set, the program conversion apparatus compiling a first source program that describes an external entry into a first machine instruction sequence and a second source program that describes a branch procedure to the external entry into a second machine instruction sequence, and linking a plurality of machine instruction sequences including the first and second machine instruction sequences, to generate an executable program, each of the first and second machine instruction sequences being composed of one or more machine instructions that each belong to one of the instruction sets, the program conversion apparatus including: a first-instruction-set-information generating unit operable to generate first instruction set information when the first source program is compiled, the first instruction set information showing an instruction set to which a machine instruction for executing a procedure described at the external entry belongs; an indefinite-branch-information generating unit operable to generate indefinite branch information when the second source program is compiled, the indefinite branch information showing a location at which a branch instruction for executing the branch procedure is to be placed, and showing that an instruction set to which a machine instruction placed at the external entry belongs is indefinite; and a branch instruction generating unit operable to generate the branch instruction for executing the branch procedure, using a branch-with-mode-change instruction for making the processor select the instruction set shown by the first instruction set information, at the location shown by the indefinite branch information, when the plurality of machine instruction sequences are linked According to this construction, the program conversion apparatus generates the indefinite branch information, at the time of compiling, instead of generating a branch instruction for making the processor select a definite instruction set. Therefore, even when an instruction set of an instruction placed at a branch destination is indefinite, the apparatus can compile a source program including a description of a branch to the branch destination.

At the time of linking, the apparatus generates a branch instruction for making the processor select an appropriate instruction set, using the first instruction-set information and the indefinite branch information. Therefore, even when re-linking is to be performed after a source program including a description of the branch destination is recompiled and consequently the first instruction-set information is changed, the indefinite branch information is not required to be changed, and so a source program including a description of a branch to the branch destination does not need to be recompiled.

(2) The program conversion apparatus according to the item (1) may further include a second-instruction-set-information generating unit operable to generate second instruction set information when the second source program is compiled, the second instruction set information showing an instruction set to which the branch instruction for executing the branch procedure is to belong, wherein the branch instruction generating unit (a) generates the branch instruction for executing the branch procedure, using the branch-with-mode-change instruction only in a case where the instruction set shown by the first instruction set information and the instruction set shown by the second instruction set information are different, and (b) generates the branch instruction for executing the branch procedure, using a branch-without-mode-change instruction for making the processor maintain a currently selected instruction set, in the other cases.

According to this construction, the same effects as specified in the item (1) can be produced.

(3) The program conversion apparatus according to the item (1) maybe an apparatus operating with one of the plurality of instruction sets being determined as a reference instruction set, the program conversion apparatus further including a mode-adjusting-instruction adding unit operable to add a mode adjusting instruction to the first machine instruction sequence when the first source program is compiled, the mode adjusting instruction being a branch-with-mode-change instruction that is for causing a branch to the external entry and for making the processor select the instruction set shown by the first instruction set information, and that belongs to the reference instruction set, wherein the indefinite-branch-information generating unit includes: a branch-information generating subunit operable to generate the indefinite branch information, only when the branch instruction for executing the branch procedure is to use direct addressing; and an indirect-branch-instruction generating subunit operable to generate the branch instruction for executing the branch procedure, using a branch-with-mode-change instruction for causing an indirect branch to the added mode adjusting instruction and for making the processor select the reference instruction set, only when the branch instruction for executing the branch procedure is to use indirect addressing.

According to this construction, a branch instruction for causing a branch to the external entry using indirect addressing can be provided with an alternative branch destination at which a mode adjusting instruction that belongs to the reference instruction set is placed. Therefore, in addition to the effects specified in the item (1), the effect can be produced of enabling a branch instruction using indirect addressing to function correctly by appropriately selecting an instruction set.

(4) In the program conversion apparatus according to the item (3), the mode-adjusting-instruction adding unit may add the mode adjusting instruction, only when the instruction set shown by the first instruction set information is not the reference instruction set, and the indirect-branch-instruction generating subunit may generate the branch instruction for executing the branch procedure, using a branch-with-mode-change instruction for causing an indirect branch to the external entry, only when the mode adjusting instruction is not added.

According to this construction, the same effects as specified in the item (3) can be produced. Further, because the apparatus does not generate a mode adjusting instruction when an instruction placed at an original branch destination belongs to the reference instruction set, a code increase to be caused by the mode adjusting instruction can be prevented.

(5) The program conversion apparatus according to the item (3) may further include: an indirect branch judging unit operable to judge whether an indirect branch to the added mode adjusting instruction is to be caused or not at a time of execution of the executable program, based on a predetermined criterion; and a mode-adjusting-instruction deleting unit operable to delete the added mode adjusting instruction, when the indirect branch judging unit judges that the indirect branch is not caused.

According to this construction, the same effects as specified in the item (4) can be produced. Moreover, a code increase to be caused by the mode adjusting instruction can be prevented more.

(6) In the program conversion apparatus according to the item (5), the indirect branch judging unit may judge that the indirect branch is not caused, when an indirect branch instruction is not included in any of the plurality of machine instruction sequences to be linked to generate the executable program.

(7) In the program conversion apparatus according to the item (5), the indirect branch judging unit may judge that the indirect branch is not caused, when an instruction referring to the added mode adjusting instruction is not included in any of the plurality of machine instruction sequences to be linked to generate the executable program.

According to these constructions, the same effects as specified in the item (5) can be produced.

(8) In the program conversion apparatus according to the item (1), the branch procedure may be a function call, the indefinite-branch-information generating unit may further generate (a) branch instruction classification information showing that the branch instruction for executing the branch procedure is to be generated using a branch instruction without recording a return address, when the function call is to be executed at an end of a caller function, and (b) branch instruction classification information showing that the branch instruction for executing the branch procedure is to be generated using a branch instruction with recording a return address, when the function call is to be executed at a location other than the end of the caller function, and the branch instruction generating unit may generate the branch instruction for executing the branch procedure, according to the generated branch instruction classification information.

According to this construction, the same effects as specified in the item (1) can be produced. Further, the apparatus can generate an executable program with shortened execution time of a return process corresponding to a function call described at an end of one function for calling another function.

(9) The program conversion apparatus according to the item (1) may further include a sorting unit operable to sort machine instructions included in each of the plurality of machine instruction sequences to be linked, according to the plurality of instruction sets, and place the machine instructions in such a manner that machine instructions that belong to a same instruction set are arranged consecutively.

According to this construction, the same effects as specified in the item (1) can be produced. Further, even when the boundary at which machine instructions are aligned is different depending on each instruction set, an area in an executable program where a machine instruction cannot be placed due to such a different alignment boundary can be minimized.

(10) The program conversion apparatus according to the item (1) may further include an instruction-set determining unit operable to determine an instruction set to which machine instructions generated by compiling the first source program belong, based on at least one of (a) a pragma instruction described in the first source program and (b) a compiler option made when the first source program is compiled, wherein the first-instruction-set-information generating unit generates the first instruction set information according to a determination made by the instruction-set determining unit.

According to this construction, the same effects as specified in the item (1) can be produced.

(11) A program conversion method of the present invention is a method targeting a processor that dynamically selects one of a plurality of instruction sets by executing a branch-with-mode-change instruction and interprets and executes a machine instruction according to the selected instruction set, the program conversion method being for compiling a first source program that describes an external entry into a first machine instruction sequence and a second source program that describes a branch procedure to the external entry into a second machine instruction sequence, and linking a plurality of machine instruction sequences including the first and second machine instruction sequences, to generate an executable program, each of the first and second machine instruction sequences being composed of one or more machine instructions that each belong to one of the instruction sets, the program conversion method including: a first-instruction-set-information generating step of generating first instruction set information when the first source program is compiled, the first instruction set information showing an instruction set to which a machine instruction for executing a procedure described at the external entry belongs; an-indefinite-branch-information generating step of generating indefinite branch information when the second source program is compiled, the indefinite branch information showing a location at which a branch instruction for executing the branch procedure is to be placed, and showing that an instruction set to which a machine instruction placed at the external entry belongs is indefinite; and a branch instruction generating step of generating the branch instruction for executing the branch procedure, by using a branch-with-mode-change instruction for making the processor select the instruction set shown by the first instruction set information, at the location shown by the indefinite branch information, when the plurality of machine instruction sequences are linked.

According to this construction, a program conversion method that produces the same effects as specified in the item (1) can be provided.

(12) The program conversion method according to the item (11) may be executed with one of the plurality of instruction sets being determined as a reference instruction set, the program conversion method further including a mode-adjusting-instruction adding step of adding a mode adjusting instruction to the first machine instruction sequence when the first source program is compiled, the mode adjusting instruction being a branch-with-mode-change instruction that is for causing a branch to the external entry and for making the processor select the instruction set shown by the first instruction set information, and that belongs to the reference instruction set, wherein the indefinite-branch-information generating step includes: a branch-information generating substep of generating the indefinite branch information, only when the branch instruction for executing the branch procedure is to use direct addressing; and an indirect-branch-instruction generating substep of generating the branch instruction for executing the branch procedure, by using a branch-with-mode-change instruction for causing an indirect branch to the added mode adjusting instruction and for making the processor select the reference instruction set, only when the branch instruction for executing the branch procedure is to use indirect addressing.

According to this construction, a program conversion method that produces the same effects as specified in the item (3) can be provided.

(13) A computer program of the present invention is a computer program for executing, using a computer, a program conversion process targeting a processor that dynamically selects one of a plurality of instruction sets by executing a branch-with-mode-change instruction and interprets and executes a machine instruction according to the selected instruction set, the program conversion process being for compiling a first source program that describes an external entry into a first machine instruction sequence and a second source program that describes a branch procedure to the external entry into a second machine instruction sequence, and linking a plurality of machine instruction sequences including the first and second machine instruction sequences, to generate an executable program, each of the first and second machine instruction sequences being composed of one or more machine instructions that each belong to one of the instruction sets, the computer program including: a first-instruction-set-information generating step of generating first instruction set information when the first source program is compiled, the first instruction set information showing an instruction set to which a machine instruction for executing a procedure described at the external entry belongs; an indefinite-branch-information generating step of generating indefinite branch information when the second source program is compiled, the indefinite branch information showing a location at which a branch instruction for executing the branch procedure is to be placed, and showing that an instruction set to which a machine instruction placed at the external entry belongs is indefinite; and a branch instruction generating step of generating the branch instruction for executing the branch procedure, by using a branch-with-mode-change instruction for making the processor select the instruction set shown by the first instruction set information, at the location shown by the indefinite branch information, when the plurality of machine instruction sequences are linked.

According to this construction, a program conversion process that produces the same effects as specified in the item (11) can be provided by utilizing the computer program.

(14) The computer program according to the item (13) may operate with one of the plurality of instruction sets being determined as a reference instruction set, the computer program further including a mode-adjusting-instruction adding step of adding a mode adjusting instruction to the first machine instruction sequence when the first source program is compiled, the mode adjusting instruction being a branch-with-mode-change instruction that is for causing a branch to the external entry and for making the processor select the instruction set shown by the first instruction set information, and that belongs to the reference instruction set, wherein the indefinite-branch-information generating step includes: a branch-information generating substep of generating the indefinite branch information, only when the branch instruction for executing the branch procedure is to use direct addressing; and an indirect-branch-instruction generating substep of generating the branch instruction for executing the branch procedure, by using a branch-with-mode-change instruction for causing an indirect branch to the added mode adjusting instruction and for making the processor select the reference instruction set, only when the branch instruction for executing the branch procedure is to use indirect addressing.

According to this construction, a program conversion process that produces the same effects as specified in the item (13) can be provided by utilizing the computer program.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 1 is a functional block diagram showing the construction of a program conversion apparatus;

FIG. 2 shows examples of pseudo instructions that are generated in an object program;

FIGS. 11A and 11B show examples of source programs in which one function is called at an end of another function;

FIG. 13 shows examples of branch instructions held by a processor that has n instruction sets;

FIG. 14A schematically shows one example of an object program resulting from compiling using a reference instruction set;

FIG. 14B schematically shows one example of an object program resulting from compiling using another instruction set;

FIGS. 15A and 15B show examples of source programs;

FIG. 16 shows examples of branch instructions held by a processor that has two instruction sets; and FIGS. 17A and 17B show examples of conventional object programs.

DESCRIPTION OF THE PREFERRED EMBODIMENT

Figure 3:
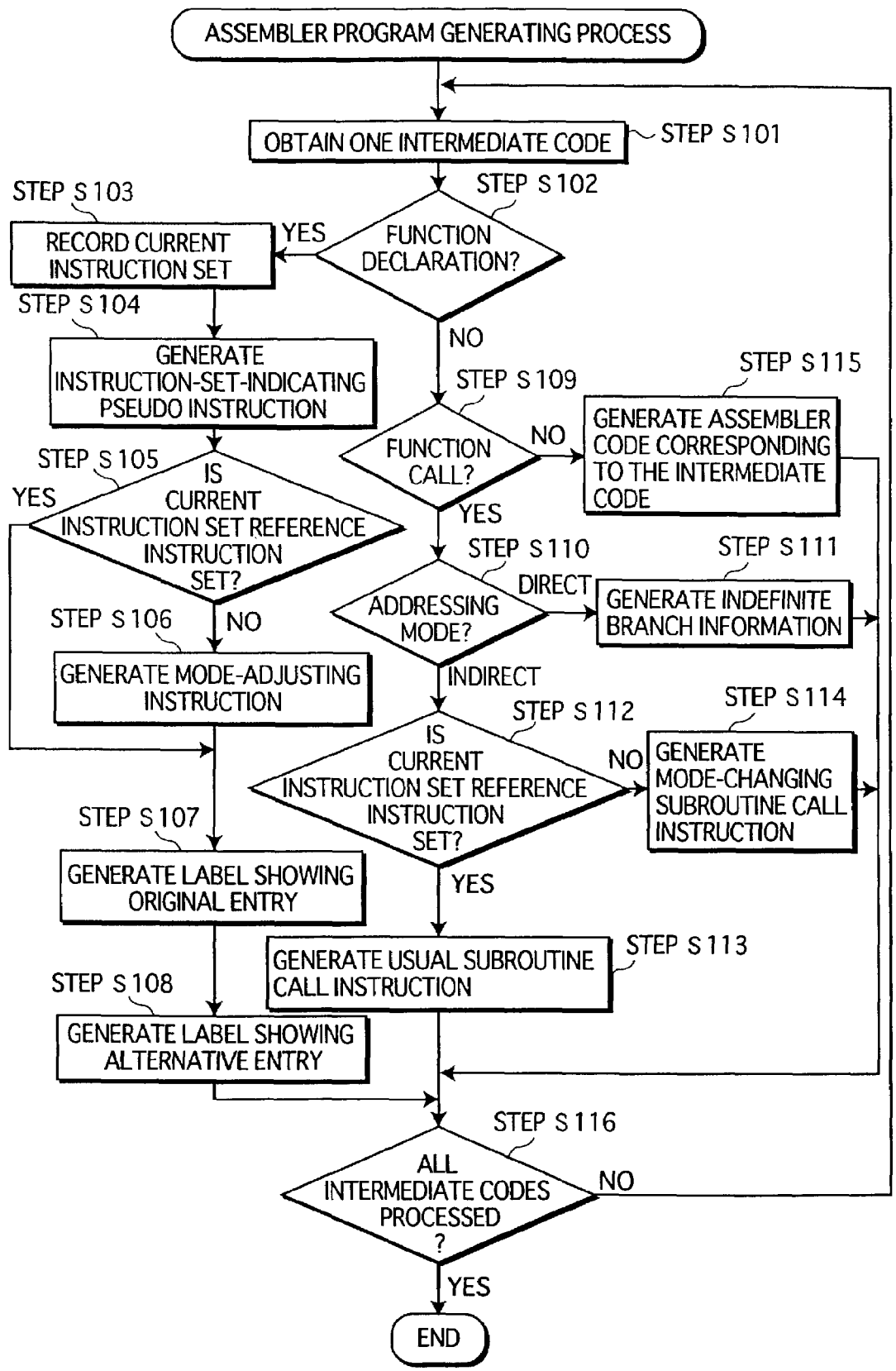
FIG. 3 is a flowchart showing a characterizing part of an assembler program generating process executed by a compiling unit.

A program conversion apparatus according to a preferred embodiment of the present invention is roughly composed of a compiler and a linker. The compiler compiles a plurality of source programs into object programs, each of which includes a machine instruction sequence, symbol information, instruction set information, and indefinite branch information. The linker links the machine instruction sequences included in the object programs using symbol information, instruction set information, and indefinite branch information included in each object program, to generate an executable program that can be executed by a processor targeted by the program conversion apparatus.

The processor dynamically selects one of a plurality of instruction sets by executing a branch-with-mode-change instruction, and interprets and executes machine instructions according to the selected instruction set.

The following are operations performed by the program conversion apparatus when a branch instruction for causing a branch procedure described in a source program is to be generated using direct addressing, and when a branch instruction for causing a branch procedure described in a source program is to be generated using indirect addressing.

(1) When a Branch Instruction is to be Generated Using Direct Addressing

The compiler generates indefinite branch information showing a location at which a branch instruction for causing a direct branch is to be placed, and also showing that an instruction set to which an instruction placed at a branch destination of the branch instruction for causing the direct branch (hereafter referred to as, a "branch destination instruction") belongs is indefinite.

Then, the linker generates a branch-with-mode-change instruction for making the processor select the instruction set to which the branch destination instruction belongs, and places the branch-with-mode-change instruction at the location shown by the indefinite branch information.

When an instruction set to which the branch instruction for causing the direct branch belongs and the instruction set to which the branch destination instruction belongs are the same, the linker generates, instead of generating the branch-with-mode-change instruction, a branch-without-mode-change instruction that is a usual branch instruction for maintaining the operation mode of the processor.

(2) When a Branch Instruction is to be Generated Using Indirect Addressing

First, the compiler prepares an alternative branch destination in the following way, so that a branch instruction for causing an indirect branch can function correctly.

One of the plurality of instruction sets is determined as a reference instruction set.

The compiler adds, for each external entry described in a source program to be compiled, a branch-with-mode-change instruction that belongs to the reference instruction set, to a machine instruction sequence resulting from the compiling. A branch-with-mode-change instruction generated for each external entry is for causing a branch to the external entry and for making the processor select an instruction set used at the external entry. Hereafter, such a branch-with-mode-change instruction generated for each external entry is referred to as a "mode adjusting instruction". Then, the compiler generates alternative entry information that shows a location at which the mode adjusting instruction is placed.

By alternative entry information generated for each external entry (referred to as "original entry") in this way, a branch instruction for causing an indirect branch to the external entry can be provided with an alternative entry that is an alternative branch destination.

The compiler generates, for a branch to each original entry, a branch-with-mode-change instruction for causing an indirect branch to an alternative entry corresponding to the original entry and for selecting the reference instruction set.

Such a branch to an alternative label caused by a branch-with-mode-change instruction generated in this way directs control correctly to an original label, while changing the operation mode of the processor from the reference instruction set to the instruction set used at the original entry.

<Overall Construction>

FIG. 1 is a functional block diagram showing the overall construction of the program conversion apparatus according to the present embodiment. The program conversion apparatus 100 is roughly composed of a compiling unit 110 and a linking unit 130. The compiling unit 110 is realized by a compiler and the linking unit 130 is realized by a linker.

The compiling unit 110 compiles a plurality of source programs 141 into a plurality of object programs 142. The linking unit 130 links the object programs 142 resulting from the compiling, to generate an executable program 143.

The program conversion apparatus 100 is specifically realized by hardware such as a microprocessor, a ROM (Read Only Memory) that stores programs, a RAM (Random Access Memory) that provides a work area, and a hard disk. The functions of the components of the program conversion apparatus 100 are realized by the microprocessor executing the programs stored in the ROM. Information is stored in the RAM and the hard disk, and is passed to and from among the components of the program conversion apparatus 100 using the RAM and the hard disk.

The program conversion apparatus 100 may receive a designation of the reference instruction set via a parameter file, a compiler option, or the like (not shown).

<Construction of Compiling Unit 110>

The compiling unit 110 is roughly composed of a lexical & syntactic analysis unit 111, an intermediate-code generating unit 112, an assembler-program generating unit 113, and an assembler unit 117. The assembler-program generating unit 113 includes an instruction-set determining unit 1131, a pseudo-instruction generating unit 114, a mode-adjusting-instruction adding unit 115, and a pseudo-branch-instruction generating unit 116. The assembler unit 117 includes an instruction-set-information generating unit 118, a branch-information generating unit 119, and a machine-instruction-sequence generating unit 120.

The compiling unit 110 reads the source program 141, performs lexical analysis and syntactic analysis of the read source program using the lexical & syntactic analysis unit 110, and generates an intermediate code sequence for the source program using the intermediate-code generating unit 112. Processing executed by the lexical & syntactic analysis unit 111 and the intermediate-code generating unit 112 is not the subject matter of the present invention, and so is not explained in detail in this specification, assuming that a technique typically used for a conventional compiler is used here.

The assembler-program generating unit 113 generates an assembler program using the read source program and the generated intermediate code, and outputs the generated assembler program to the assembler unit 117. This assembler program is described using a new assembler language that can be obtained by adding pseudo instructions characterizing the present invention, to a conventional assembler language.

The assembler unit 117 obtains the assembler program and assembles the obtained assembler program, to generate the object program 142 that includes not only a machine instruction sequence and symbol information that are also generated by a conventional assembler, but also instruction set information and indefinite branch information that characterize the present invention.

<Pseudo Instructions to be Added>

FIG. 2 shows examples of an instruction-set-indicating pseudo instruction and a pseudo branch instruction that are additional features of the assembler language relating to the present invention. A "pseudo instruction" field 151 stores a mnemonic representing a pseudo instruction, an "operand" field 152 stores an operand that can be included in the pseudo instruction, a "meaning" field 153 stores a meaning of the pseudo instruction, and an "assembler operation" field 154 stores an operation to be performed by the assembler according to the pseudo instruction.

<Details of Assembler-program Generating Unit 113>

The assembler-program generating unit 113 generates an assembler program using the read source program and the generated intermediate code. The following explains, in detail, the construction part that characterizes the present invention.

<Instruction-set Determining Unit 1131>

The instruction-set determining unit 1131 records an instruction set shown by a pragma directive lastly processed in a compiling process. At the start of compiling, the instruction-set determining unit 1131 may record an instruction set designated by a compiler option.

The instruction set recorded here is used to determine an instruction set to which machine instructions sequentially generated by compiling a source program are to belong.

<Pseudo-instruction Generating Unit 114>

The pseudo-instruction generating unit 114 generates, in an assembler program, an instruction-set-indicating pseudo instruction that indicates an instruction set determined for each pragma directive described in a source program by the instruction-set determining unit 1131. Also, when an instruction set used for compiling is designated in advance by a compiler option or the like, the pseudo-instruction generating unit 114 may generate, at the start of an assembler program, an instruction-set-indicating pseudo instruction that indicates the designated instruction set.

<Mode-adjusting-instruction Adding Unit 115>

The mode-adjusting-instruction adding unit 115 identifies an instruction set used at an external entry (specifically including a function entry) that is an original entry described in a source program, based on a pragma directive described in the source program, or based on a compiler option. Then, only when an identified instruction set used at an original entry is not the reference instruction set, the mode-adjusting-instruction adding unit 115 adds, to an assembler program, a branch-with-mode-change instruction that belongs to the reference instruction set, as a mode adjusting instruction. The branch-with-mode-change instruction is for causing a branch to the original entry and for selecting the identified instruction set.

Also, the mode-adjusting-instruction adding unit 115 attaches, for each original entry, a label showing an alternative entry corresponding to the original entry. To be more specific, for an original entry for which a mode adjusting instruction explained above is provided, a label showing an alternative entry is attached at such a location that points to the mode adjusting instruction. For an original entry for which no mode adjusting instruction explained above is provided, a label showing an alternative entry is attached at such a location that points to the same as a label showing the original entry points to.

An original entry and an alternative entry may be associated with each other by regularity in naming their labels. For example, a label showing an original entry may be named by adding a prefix "_0" to a name of an external entry (specifically including a function name) described in a source program, and a label showing an alternative entry may be named by adding a prefix "_" to the name of the external entry.

Moreover, a mode adjusting instruction explained above may be placed anywhere except such a location where the mode adjusting instruction is to be continuously executed along with execution of an instruction immediately preceding the mode adjusting instruction. For example, when an external entry for which a mode adjusting instruction is provided is a function entry, the mode adjusting instruction may be placed to immediately precede the first instruction of the function.

<Pseudo-branch-instruction Generating Unit 116>

The pseudo-branch-instruction generating unit 116 executes the following processing for each branch described in a source program.

When a branch instruction for causing a branch is to be generated using direct addressing, the pseudo-branch-instruction generating unit 116 generates, instead of the branch instruction for causing the branch, a pseudo branch instruction in an assembler program.

To be specific, when the branch is described using a "goto" statement or when the branch is a function call that is described at the end of one function for calling another function, the pseudo-branch-instruction generating unit 116 generates a "brx" pseudo instruction that instructs to generate a branch instruction without recording a return address. When the branch is a function call that is described at a location other than the end of one function for calling another function, the pseudo-branch-instruction generating unit 116 generates a "callx" pseudo instruction that instructs to generate a branch instruction with recording a return address.

A pseudo branch instruction generated in this way indicates (1) that an instruction set to which an instruction placed at a branch destination of the branch instruction for causing the branch belongs is indefinite, (2) a location at which the branch instruction to be generated is to be placed, and (3) whether the branch instruction for causing the branch has a recording of a return address or not.

On the other hand, when a branch instruction for causing a branch is to be generated using indirect addressing, the pseudo-branch-instruction generating unit 116 generates a branch instruction for causing an indirect branch to an alternative entry corresponding to an original entry, and for selecting the reference instruction set. In this case, the pseudo-branch-instruction generating unit 116 does not generate a pseudo branch instruction. It should be noted here that when the branch instruction for causing the branch is to belong the reference instruction set, the pseudo-branch-instruction generating unit 116 may generate an indirect branch instruction for maintaining a currently selected instruction set.

This pseudo-branch-instruction generating unit 116, and the branch-information generating unit 119 that is described later correspond to the unfixed-branch-information generating unit that is defined in the claims. In particular, a part of the pseudo-branch-instruction generating unit 116 relating to generation of an indirect branch instruction corresponds to the indirect-branch-instruction generating subunit that is defined in the claims.

<Operation of Assembler-program Generating Unit 113>

FIG. 3 is a flowchart showing cooperative processing among the components of the assembler-program generating unit 113. The following is a supplementary explanation on the cooperative processing among the components explained above, with reference to the flowchart.

For ease of explanation, the following assumes that a declaration of each function is described to follow a pragma directive that designates an instruction set, a branch procedure described in a source program is a function call, and a branch instruction for executing the function call is generated using a subroutine call instruction.

The assembler-program generating unit 113 obtains one intermediate code (step S101).

When the obtained intermediate code represents a declaration of a function (step S102: YES), the pseudo-instruction generating unit 114 records, as the current instruction set, an instruction set designated by a pragma directive described as attached to the function declaration in a source program (step S103). Then, the pseudo-instruction generating unit 114 generates an instruction-set-indicating pseudo instruction that indicates the instruction set designated by the pragma directive, in an assembler program (step S104).

Only when the current instruction set is not the reference instruction set (step S105: NO), the mode-adjusting-instruction adding unit 115 generates a mode adjusting instruction (step S106). The mode-adjusting-instruction adding unit 115 generates a label showing an original entry of the function (step S107), and generates a label showing an alternative entry corresponding to the original entry (step S108).

When the obtained intermediate code represents a function call (step S109: YES), the mode-adjusting-instruction adding unit 115 operates according to an addressing mode used for a subroutine call instruction for executing the function call. To be more specific, the mode-adjusting-instruction adding unit 115 generates a pseudo branch instruction (step S111) in the case where the addressing mode is direct addressing (step S110: direct). In the case where the addressing mode is indirect addressing (step S110: indirect), the mode-adjusting-instruction adding unit 115 generates a subroutine call instruction that does not change the currently selected instruction set (step S113) when the current instruction set is the reference instruction set (step S112: YES), and generates a mode-changing subroutine call instruction for selecting the reference instruction set (step S114) when the current instruction set is not the reference instruction set (step S112: NO).

When the obtained intermediate code represents another part of the source program (step S109: NO), the assembler-program generating unit 113 generates an assembler code for executing the obtained intermediate code (step S115)

The above processing is repeated until all the intermediate codes are processed (step S116).

<Assembler Program>

Figure 4A:
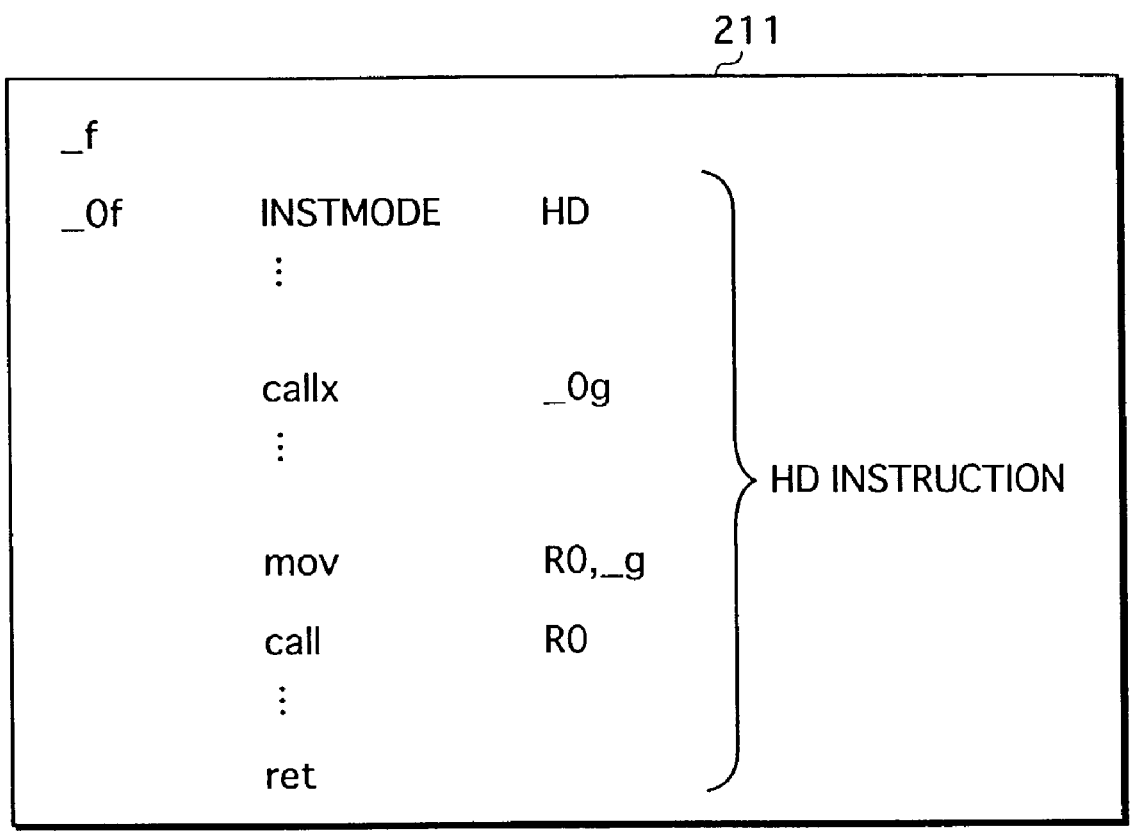
FIG. 4A schematically shows one example of an object program resulting from compiling using an HD instruction set.
Figure 4B:
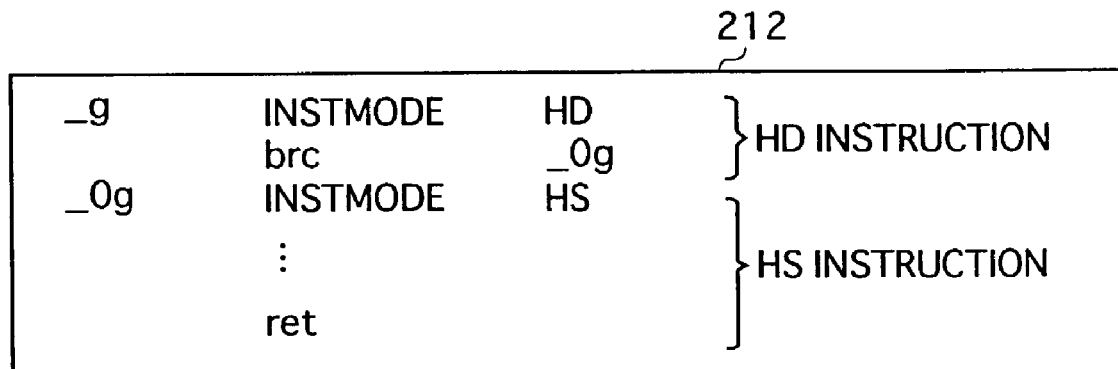
FIG. 4B schematically shows one example of an object program resulting from compiling using an HS instruction set.

FIGS. 4A and 4B show specific examples of assembler programs generated by the assembler-program generating unit 113. These assembler programs are generated by compiling the source programs shown in FIGS. 15A and 15B, with an HD instruction set being determined as the reference instruction set.

The following explains one line after another of the assembler program 211 shown in FIG. 4A that has been generated by compiling the source program shown in FIG. 15A.

(1) From a pragma directive designating an HD instruction set described to immediately precede the function "f", an instruction-set-indicating pseudo instruction "INST-MODE HD" is generated. Here, an HD instruction set is recorded as the current instruction set.

(2) From a declaration of the function "f", a label "_0f" showing an original entry is generated. This label is attached at such a location that points to the generated instruction-set-indicating pseudo instruction.

By referring to the recorded current instruction set, it can be identified that a machine instruction placed at the original entry "_0f" belongs to an HD instruction set. Therefore, a mode adjusting instruction is not generated for this original entry, and a label "_f" showing an alternative entry is generated and attached at such a location that points to the same instruction as the label showing the original entry points to.

(3) From a function "g" direct call "g( );", a pseudo branch instruction "callx" is generated. The pseudo branch instruction "callx" instructs to generate a branch instruction with recording a return address for causing a branch to the original entry "_0g" of the function "g" using direct addressing.

(4) From an address assignment "func=&g;" of assigning an address of the function "g" to a pointer variable "func", a "mov" instruction is generated. The "mov" instruction instructs to assign an address "_g" shown by a label showing an alternative entry of the function "g" to a register "R0".

Then, from a function "g" indirect call "(*func) ( );", a branch instruction for causing a branch to an address shown by the contents of the register "R0" using indirect addressing is generated.

By referring to the recorded current instruction set, it can be identified that the instruction to be generated here belongs to an HD instruction set, and also, a machine instruction placed at an alternative entry belongs, without fail, to an HD instruction that is the reference instruction set. Therefore, a "call" instruction for maintaining the currently selected instruction set is generated as this branch instruction.

The following explains one line after another of the assembler program 212 shown in FIG. 4B that has been generated by compiling the source program shown in FIG. 15B.

(1) From a pragma directive designating an HS instruction set described to immediately precede the function "g", an instruction-set-indicating pseudo instruction "INSTMODE HS" is generated. Here, an HS instruction set is recorded as the current instruction set (2) From a declaration of the function "g", a label "\_0g" showing an original entry is generated. This label is attached at such a location that points to the generated instruction-set-indicating pseudo instruction.

By referring to the recorded current instruction set, it can be identified that a machine instruction placed at the original entry "\_0g" belongs to an HS instruction set. Therefore, a mode adjusting instruction "brc\_0g" is generated for the original entry. Because this mode adjusting instruction "brc\_0g" is generated using an HD instruction set that is the reference instruction set, an instruction-set-indicating pseudo instruction "INSTMODE HD" is generated to immediately precede the mode adjusting instruction "brc\_0g". Then, a label "\_g" showing an alternative entry is generated and attached at such a location that points to this mode adjusting instruction.

<Object Program>

FIGS. 5A to 5D show examples of the specific data structure for representing an object program that includes a machine instruction sequence into which an assembler program explained above is converted. The exemplified contents represent an object program into which the assembler program shown in FIG. 4A is converted.

Figures 5A, 5B, 5C, 5D:
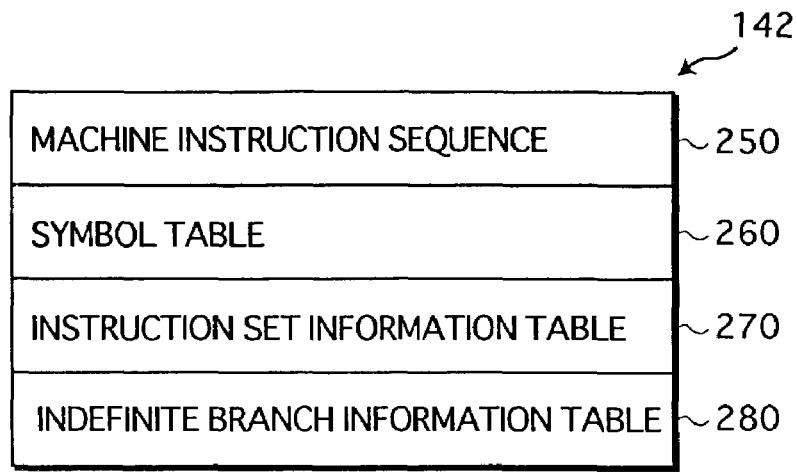
FIG. 5A shows the overall structure of one example of specific data representing an object program.
FIG. 5B shows one example of a symbol table.
FIG. 5C shows one example of an instruction set information table.
FIG. 5D shows one example of an indefinite branch information table.

FIG. 5A shows the overall construction of the object program 142, and is composed of a machine instruction sequence 250, a symbol table 260, an instruction set information table 270, and an indefinite branch information table 280.

FIG. 5B shows the construction of the symbol table 260 in detail. A "symbol" field 261 stores a label showing an external entry, a "classification" field 262 stores classification information showing a classification of the label of either "definition" or "reference", an "address" field 263 stores a relative address of a location at which the label is attached in the machine instruction sequence when the classification information shows "definition", and stores a relative address of a location at which an instruction showing a reference to the label is placed in the machine instruction sequence when the classification information shows "reference".

It should be noted here that the symbol table 260 can also store an alternative entry added by the mode-adjusting-instruction adding unit 115.

FIG. 5C shows the construction of the instruction set information table 270 in detail. A "symbol" field 271 stores a label showing an external entry, and an "instruction set" field 272 stores a symbol that represents an instruction set to which a machine instruction placed at or following the external entry belongs.

FIG. 5D shows the construction of the indefinite branch information table 280 in detail. A "pseudo branch instruction" field 281 stores a mnemonic that represents a pseudo branch instruction, and an "address" field 282 stores a relative address of a location at which the pseudo branch instruction appears in the machine instruction sequence.

<Details of Assembler Unit 117>

The assembler unit 117 assembles the generated assembler program, to generate the object program 142 that includes not only a machine instruction sequence and symbol information that are also generated by a conventional assembler, but also instruction set information and indefinite branch information that characterize the present invention. The following explains, in detail, the construction part that characterizes the present invention.

<Instruction-Set-Information Generating Unit 118>

The instruction-set-information generating unit 118 associates, for each instruction-set-indicating pseudo instruction included in the assembler program, a label that points to the instruction-set-indicating pseudo instruction with an instruction set indicated by the instruction-set-indicating pseudo instruction, and writes them to the instruction set information table 270. Also, the instruction-set-information generating unit 118 instructs the machine-instruction-sequence generating unit 120 to convert an assembler code following the instruction-set-indicating pseudo instruction in the assembler program, into a machine instruction that belongs to an instruction set indicated by the instruction-set-indicating pseudo instruction.

<Branch-information Generating Unit 119>

The branch-information generating unit 119 associates, for each pseudo branch instruction included in the assembler program, a mnemonic of the pseudo branch instruction with a relative address of a location at which the pseudo branch instruction appears in the machine instruction sequence, and writes them to the indefinite branch information table 280.

<Machine-instruction-sequence Generating Unit 120>

The machine-instruction-sequence generating unit 120 converts each assembler code included in the assembler program except pseudo instructions included therein, into a machine instruction that belongs to an instruction set designated by the instruction-set-information generating unit 118.

Also, for each pseudo branch instruction, the machine-instruction-sequence generating unit 120 reserves an area whose size is equivalent to a branch instruction to be generated according to the pseudo branch instruction, at a location where the branch instruction is to be placed.

<Construction of Linking Unit 130>

The linking unit 130 is roughly composed of a branch-instruction generating unit 131, a mode-adjusting-instruction deleting unit 132, and a placing unit 133 that includes a sorting unit 134.

The linking unit 130 reads all the object programs 142 to be linked, links machine instruction sequences included in the object programs using instruction set information, indefinite branch information, and symbol information included in each object program, and resolves external references, so as to generate the executable program 143. The following explains, in detail, the construction part that characterizes the present invention.

<Branch-instruction Generating Unit 131>

The branch-instruction generating unit 131 first recognizes an address shown by the indefinite branch information as a branch-instruction placement address, which is an address of a location at which a branch instruction to be generated according to the indefinite branch information is to be placed. The branch-instruction generating unit 131 then retrieves symbol information having an address that matches the branch-instruction placement address, from the symbol information table. The branch-instruction generating unit 131 then recognizes a label shown by the retrieved symbol information as a branch destination of the branch instruction to be generated according to the indefinite branch information.

Following this, the branch-instruction generating unit 131 retrieves (a) an instruction set that is associated with a label attached at or in close vicinity of the location shown by the branch-instruction placement address and (b) an instruction set that is associated with a label attached at or in close vicinity of the branch destination, from the instruction set information table.

When the retrieved instruction sets are the same, the branch-instruction generating unit 131 replaces a description at the location shown by the branch-instruction placement address in the machine instruction sequence, with a machine code representing a "call" instruction for maintaining the currently selected instruction set. When the retrieved instruction sets are not the same, the branch-instruction generating unit 131 replaces the description at the location shown by the branch-instruction placement address in the machine instruction sequence, with a machine code representing a "callc" instruction for changing the currently selected instruction set.

It should be noted here that the "call" instruction and the "callc" instruction are both generated using direct addressing. This is because the compiling unit 110 does not generate indefinite branch information but generates an appropriate indirect branch instruction in advance, for a branch instruction to be generated using indirect addressing as described above.

<Mode-adjusting-instruction Deleting Unit 132>

The mode-adjusting-instruction deleting unit 132 retrieves symbol information (a) that shows a definition of a label having a prefix of "_0" at its end, and symbol information (b) that shows a definition of the same label but having a prefix"_" at its end, from the symbol information table. When an address shown by the symbol information (a) and an address shown by the symbol in formation (b) are different, the mode-adjusting-instruction deleting unit 132 recognizes that a mode adjusting instruction has been added at a location pointed by the label having the prefix "_".

When recognizing that the mode adjusting instruction has been added, the mode-adjusting-instruction deleting unit 132 retrieves symbol information showing a reference to the label having the prefix "_", from the symbol information table. When not finding such symbol information, the mode-adjusting-instruction deleting unit 132 judges that a branch to the mode adjusting instruction using indirect addressing is not caused during execution, and so deletes the mode adjusting instruction from the machine instruction sequence.

Alternatively, the mode-adjusting-instruction deleting unit 132 may retrieve an indirect addressing branch instruction from the machine instruction sequence. When not finding such a branch instruction, the mode-adjusting-instruction deleting unit 132 may judge that a branch to the mode adjusting instruction using indirect addressing is not caused during execution, and so may delete the mode adjusting instruction.

After deleting the mode adjusting instruction, the mode-adjusting-instruction deleting unit 132 advances machine instructions that follow the mode adjusting instruction in the machine instruction sequence, and updates addresses shown by symbol information and indefinite branch information according to the advancement.

It should be noted here that a part of the mode-adjusting-instruction deleting unit 132 relating to the judgment as to whether a branch using indirect addressing mode is caused corresponds to the indirect branch judging unit that is defined in the claims.

<Placing Unit 133>

The placing unit 133 determines an absolute address of a placement location at which each of consecutive parts of machine instructions that belong to the same instruction set is to be placed, for each machine instruction sequence resulting after the processing relating to generation of a branch instruction and deletion of a mode adjusting instruction. Here, the sorting unit 134 sorts parts of machine instructions, according to instruction sets. The placing unit 133 determines absolute addresses of these parts in such a manner that machine instructions that belong to the same instruction set are placed consecutively in an executable program.

The linking unit 130 places these parts, based on their determined absolute addresses, and resolves a reference to each external entry shown in the symbol information table, so as to generate the executable program 143.

<Operation of Linking Unit 130>

Figure 6:
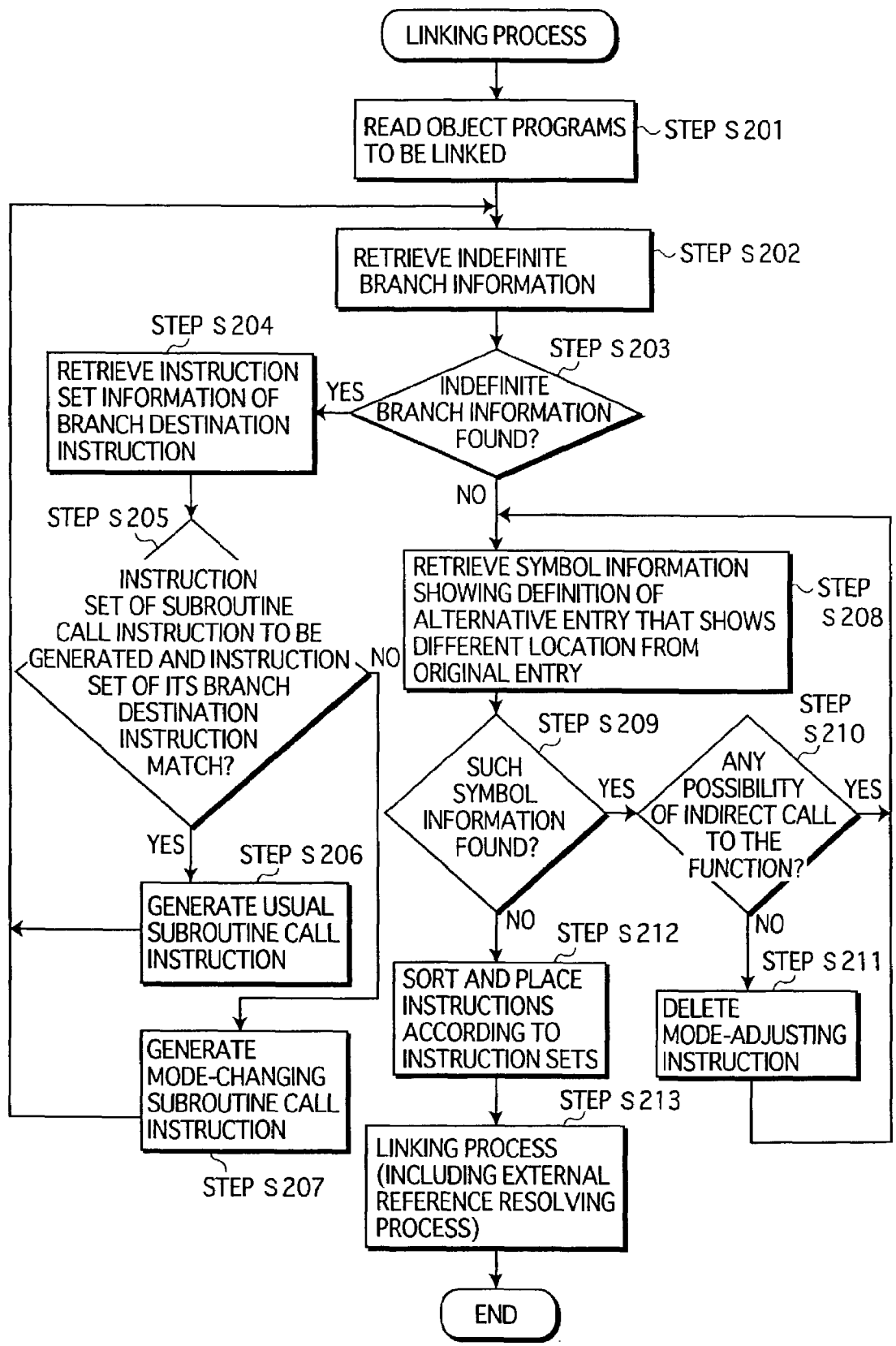
FIG. 6 is a flowchart showing a characterizing part of a linking process executed by a linking unit.

FIG. 6 is a flowchart showing cooperative processing among the components of the linking unit 130. The following is a supplementary explanation on the cooperative processing among the components explained above, with reference to the flowchart.

For ease of explanation, the following assumes that a branch procedure described in a source program is a function call, and a branch instruction for executing the function call is generated using a subroutine call instruction.

The linking unit 130 reads all object programs to be linked (step S201).

The branch-instruction generating unit 131 retrieves, for indefinite-branch instruction of each object program (steps S202 and S203), instruction set information corresponding to a branch destination instruction of a subroutine call generated according to the indefinite branch information, and identifies an instruction set to which the branch destination instruction belongs (step S204). When the instruction set for the subroutine call instruction and the instruction set for the branch destination instruction are the same (step S205: YES), the branch-instruction generating unit 131 replaces the contents at a location shown by the indefinite branch information in the machine instruction sequence, with a subroutine call instruction for maintaining the currently selected instruction set (step S206). When those instruction sets are not the same (step S205: NO), the branch-instruction generating unit 131 replaces the contents at the location, with a mode-changing subroutine call instruction for changing the currently selected instruction set (step S207).

The mode-adjusting-instruction deleting unit 132 retrieves, for symbol information showing an alternative entry label that points to a different location from an original entry label (steps S208 and S209), symbol information that shows a reference to the alternative entry label. When not finding such other symbol information (step S210: NO), the mode-adjusting-instruction deleting unit 132 deletes a mode adjusting instruction placed at the alternative entry (step S211).

The sorting unit 134 sorts parts of machine instructions included in each machine instruction sequence, according to instruction sets. The placing unit 133 determines absolute addresses of these parts in such a manner that parts sorted as belonging to the same instruction set are arranged consecutively (step S212). The linking unit 130 then executes a linking process including an external reference resolving process (step S213).

<Executable Program>

Figure 7:
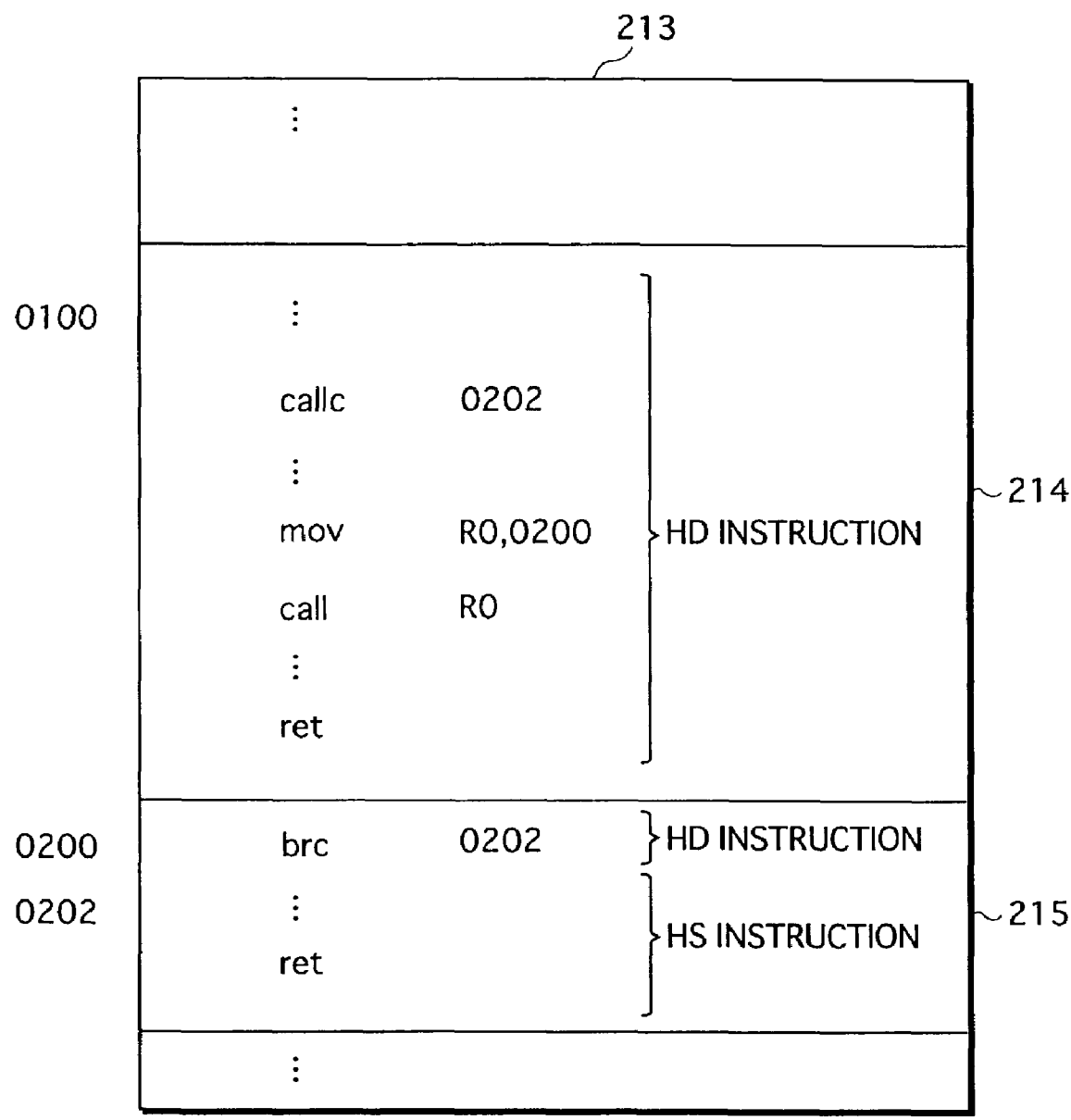
FIG. 7 shows one example of an executable program.

FIG. 7 shows a specific example of an executable program generated by the linking unit 130. FIG. 7 schematically shows, using an assembler notation, an executable program generated by concatenating machine instruction sequences corresponding to the assembler programs shown in FIGS. 4A and 4B. The machine instruction sequence 214 and the machine instruction sequence 215 included in the executable program 213 are respectively derived from the assembler program 211 and the assembler program 212.

Using the symbol information table and the indefinite branch information table shown in FIGS. 5B and 5D, the branch-instruction generating unit 131 recognizes that a branch destination of a branch instruction generated according to a pseudo branch instruction "callx" is a label "_0g".

Also, using the instruction set information table shown in FIG. 5C, the branch-instruction generating unit 131 recognizes that the branch instruction belongs to an HD instruction set and a machine instruction placed at the branch destination "_0g" of the branch instruction belongs to an HS instruction set. Because the instruction sets to which the branch instruction and the machine instruction belong are not the same, the branch-instruction generating unit 131 replaces a description at the location shown by the pseudo branch instruction, with a branch instruction "callc" that belongs to an HD instruction set for changing the currently selected instruction set.

The mode-adjusting-instruction deleting unit 132 retrieves a location at which the label "_0g" is defined and a location at which a label "_g" is defined, from the symbol information table. Because the retrieved locations are not the same, the mode-adjusting-instruction deleting unit 132 recognizes that a mode adjusting instruction has been added at a location pointed by the label "_g".

Then, the mode-adjusting-instruction deleting unit 132 retrieves symbol information showing a reference to the label "_g", from the symbol information table. Because the label "_g" is referenced by a "mov" instruction, such symbol information is found. Therefore, the mode adjusting instruction is not deleted.

The placing unit 133 determines placement locations of instructions in such a manner that HD instructions are arranged consecutively, and HS instructions are arranged consecutively. Then, the linking unit 130 executes a conventional external reference resolving process, using the symbol information table, so as to generate the executable program shown in FIG. 7.

<Other Combinations of Instruction Sets>

FIGS. 4A and 4B, and FIG. 7 show example cases where a callee function using an HS instruction set is called by a caller function using an HD instruction set.

The following are examples of other combinations of instruction sets for a caller function and a callee function, when two instruction sets, namely, HD and HS, are available.

<HD Function Called by HD Function>

Figure 8A:
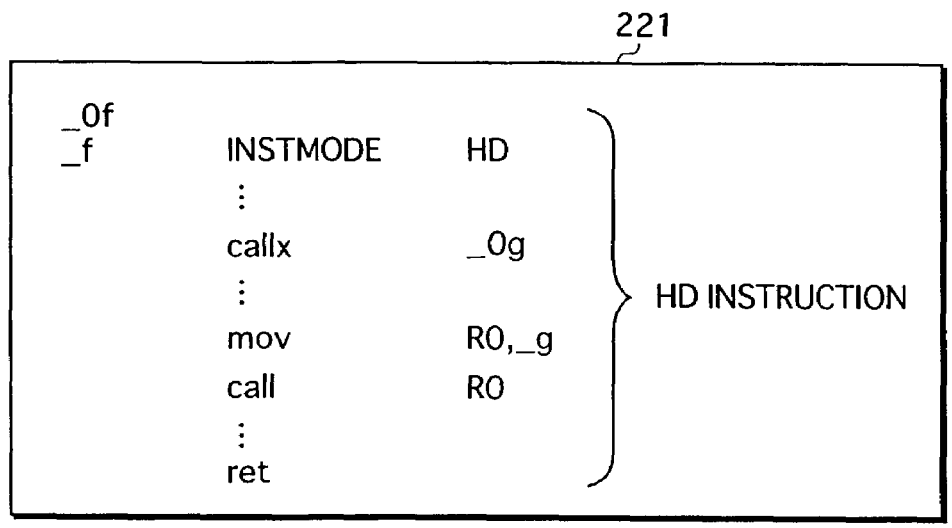
FIG. 8A shows one example of an object program resulting from compiling using an HD instruction set.
Figure 8B:
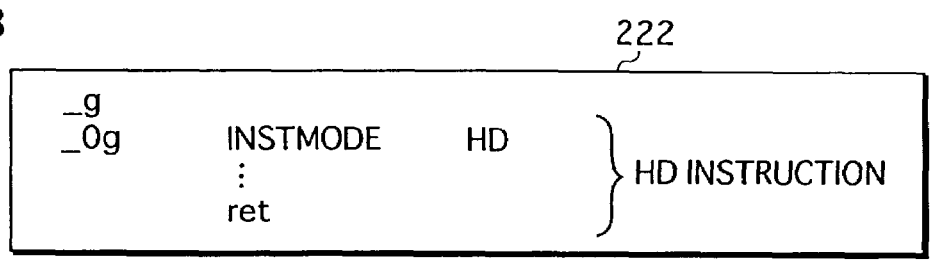
FIG. 8B shows one example of an object program resulting from compiling using an HD instruction set.
Figure 8C:
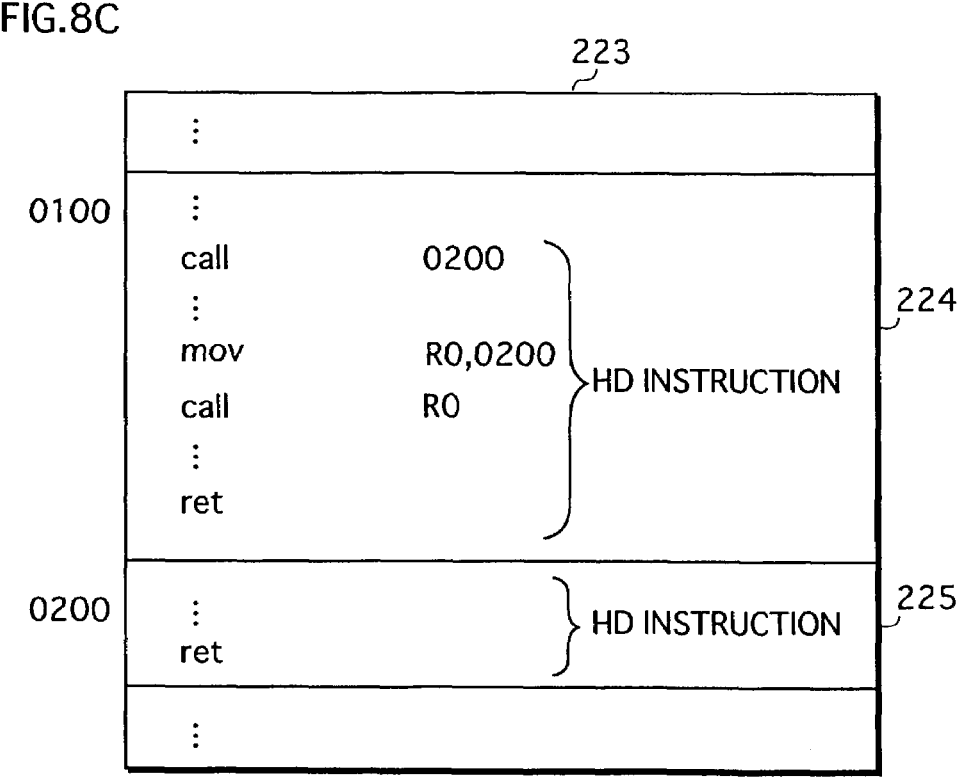
FIG. 8C shows one example of an executable program generated by linking the object programs shown in FIGS. 8A and 8B.

FIGS. 8A to 8C show a case where a callee function using an HD instruction set is called by a caller function using an HD instruction set. FIGS. 8A and 8B show the object program 221 and the object program 222 that are obtained by compiling the source programs shown in FIGS. 15A and 15B using an HD instruction set. FIG. 8C shows an executable program 223 obtained by linking the object program 221 and the object program 222. A machine instruction sequence 224 and a machine instruction sequence 225 are respectively derived from the object program 221 and the object program 222.

Because both the function "f" and the function "g" are compiled using an HD instruction set that is the reference instruction set, a mode adjusting instruction is not added. As a result, alternative entry labels "_f" and "_g" for these functions are provided respectively at such locations that point to the same as their respective original entry labels "_0f" and "_0g" point to.

Using indefinite branch information "callx" generated in the object program 221, a subroutine call instruction "call" using direct addressing for maintaining the currently selected instruction set is generated in the machine instruction sequence 224 at the time of linking.

Further, from an indirect branch procedure, a subroutine call instruction "call" using indirect addressing for changing the currently selected instruction set is generated in the object program 221.

<HD Function Called by HS Function>

Figure 9A:
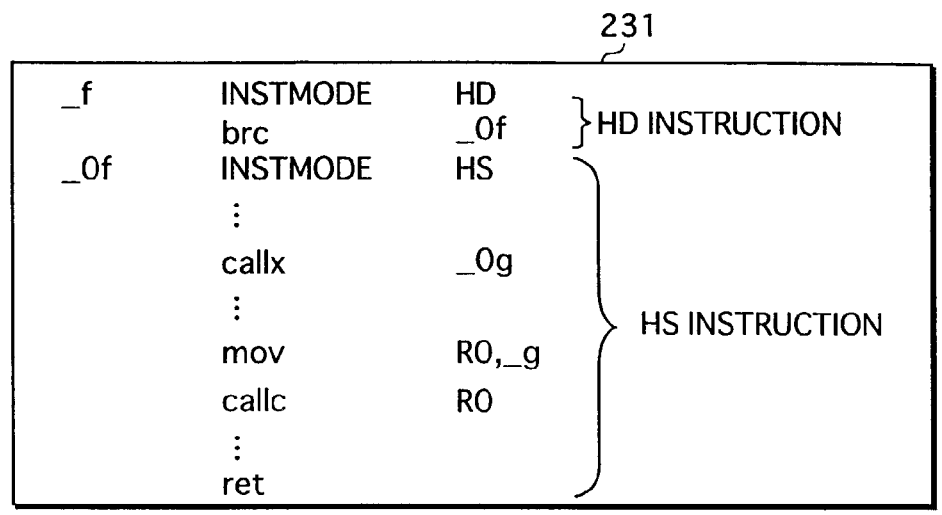
FIG. 9A shows one example of an object program resulting from compiling using an HS instruction set.
Figure 9B:
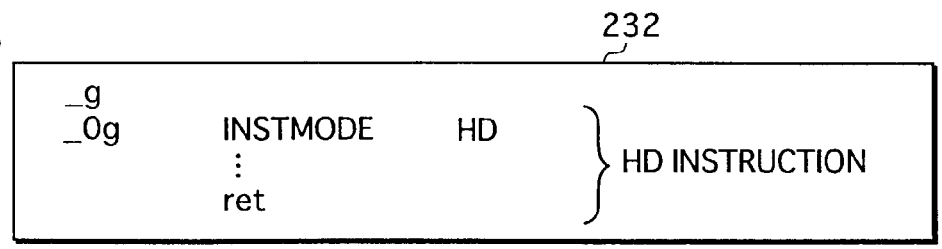
FIG. 9B shows one example of an object program resulting from compiling using an HD instruction set.
Figure 9C:
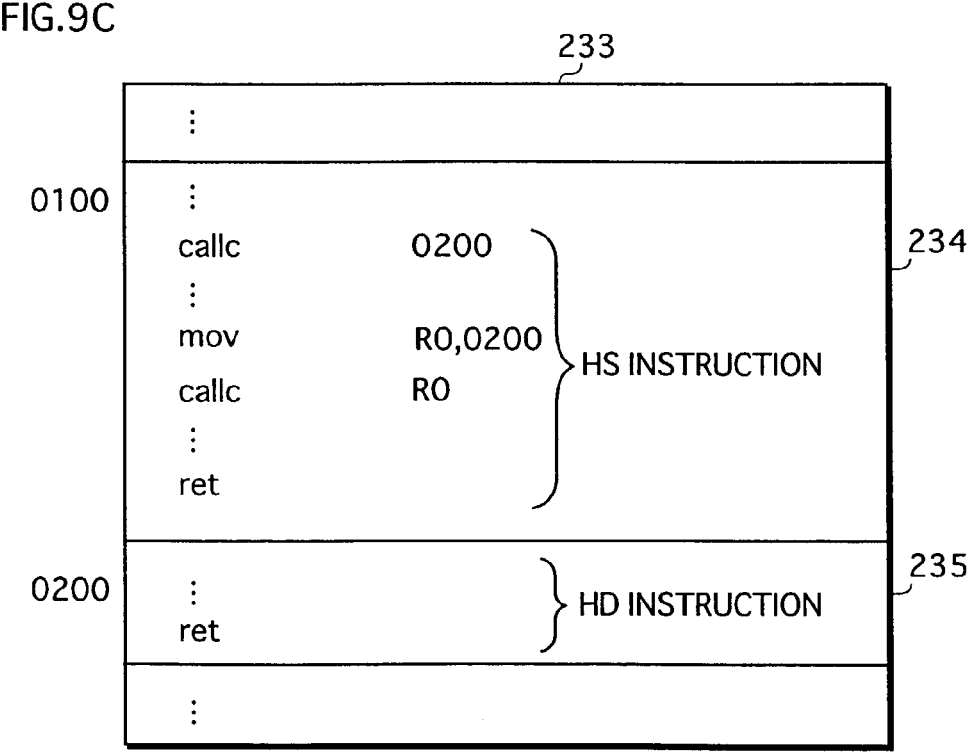
FIG. 9C shows one example of an executable program generated by linking the object programs shown in FIGS. 9A and 9B.

FIGS. 9A to 9C show a case where a callee function using an HD instruction set is called by a caller function using an HS instruction set. FIGS. 9A and 9B show the object program 231 and the object program 232 that are obtained by compiling the source programs shown in FIGS. 15A and 15B respectively using an HS instruction set and an HD instruction set. FIG. 9C shows an executable program 233 obtained by linking the object program 231 and the object program 232. A machine instruction sequence 234 and a machine instruction sequence 235 are respectively derived from the object program 231 and the object program 232.

Because the function "f" is compiled using an HS instruction set that is not the reference instruction set, a mode adjusting instruction "brc" is added in the object program 231, and an alternative entry label "_f" for the function "f" is placed at such a location that points to the mode adjusting instruction "brc". It should be noted here that because the mode adjusting instruction "brc" in the present example does not show a reference to the alternative entry label "_f" and is deleted at the time of linking, the mode adjusting instruction "brc" is not shown in FIG. 9C.

An alternative entry label "_g" for the function "g" is placed at such a location that points to the same instruction as an original entry label "_0g" points to.

Using indefinite branch information "callx" generated in the object program 231, a subroutine call instruction "callc" using direct addressing for changing the currently selected instruction set is generated in the machine instruction sequence 234 at the time of linking.

Further, from an indirect branch procedure, a subroutine call instruction "callc" using indirect addressing for changing the currently selected instruction set is generated in the object program 231.

<HS Function Called by HS Function>

Figure 10A:
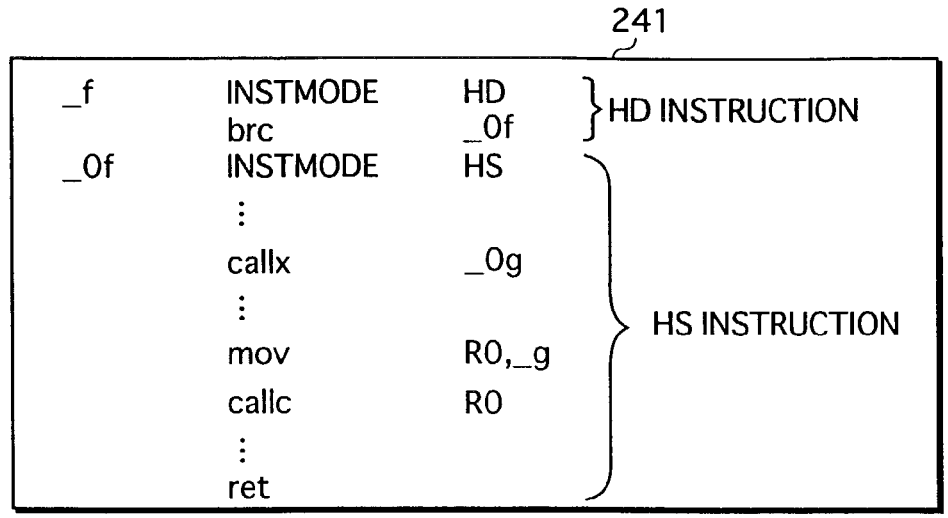
FIG. 10A shows one example of an object program resulting from compiling using an HS instruction set.
Figure 10B:
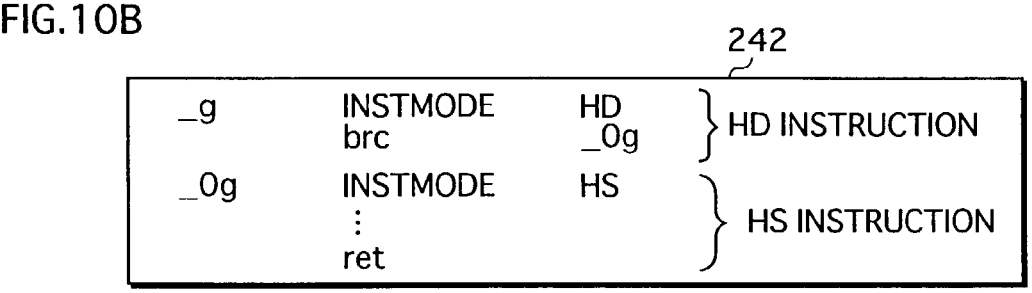
FIG. 10B shows one example of an object program resulting from compiling using an HD instruction set.

FIG. 10 shows a case where a callee function using an HS instruction set is called by a caller function using an HS instruction set. FIGS. 10A and 10B show the object program

Figure 10C:
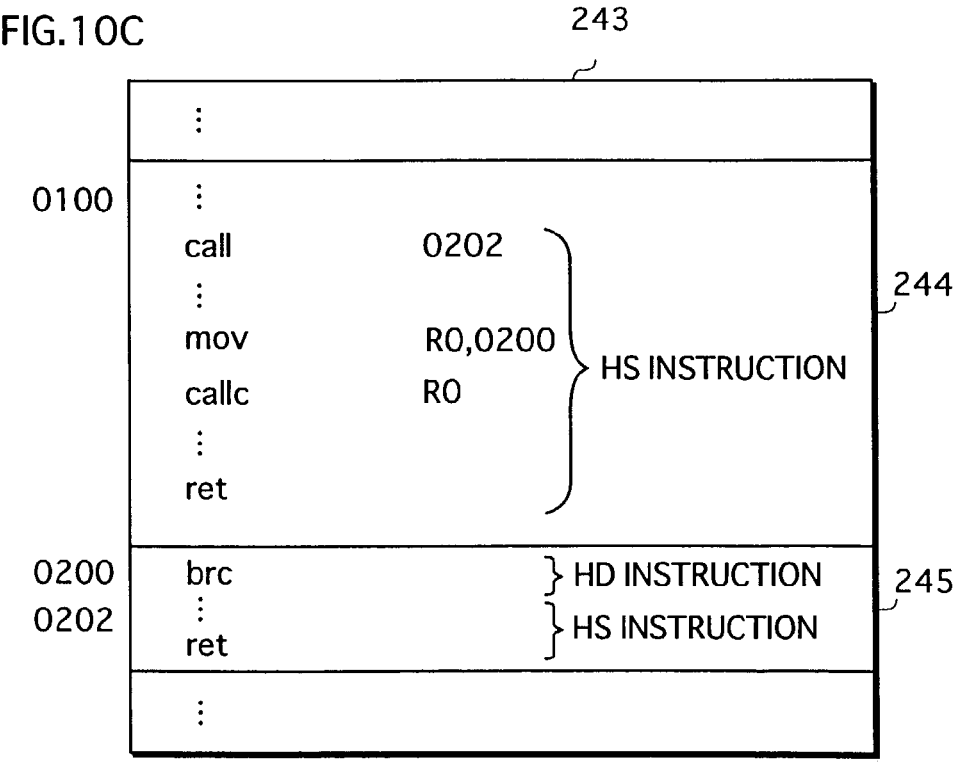
FIG. 10C shows one example of an executable program generated by linking the object programs shown in FIGS. 10A and 10B.

241 and the object program 242 that are obtained by compiling the source programs shown in FIGS. 15A and 15B using an HS instruction set. FIG. 10C shows an executable program 243 obtained by linking the object program 241 and the object program 242. A machine instruction sequence 244 and a machine instruction sequence 245 are respectively derived from the object program 241 and the object program 242.

Because both the function "f" and the function "g" are compiled using an HS instruction set that is not the reference instruction set, a mode adjusting instruction "brc" is added in each of the object program 241 and the object program 242, and each of an alternative entry label "_f" for the function "f" and an alternative entry label "_g" for the function "g" is placed at such a location that points to its mode adjusting instruction "brc". It should be noted here that the mode adjusting instruction "brc" for the function "f" in the present example does not show a reference to the alternative entry label "_f" and is deleted at the time of linking, the mode adjusting instruction "brc" for the function "f" is not shown in FIG. 9C.

Using indefinite branch information "callx" generated in the object program 241, a subroutine call instruction "call" using direct addressing for maintaining the currently selected instruction set is generated in the machine instruction sequence 244 at the time of linking.

Further, from an indirect branch, a subroutine call instruction "callc" using indirect addressing for changing the currently selected instruction set is generated in the object program 241.

<Conclusions>

According to the program conversion apparatus 100 as described above, at the time of compiling, the compiling unit 110 generates, instead of an actual branch instruction to be generated, indefinite branch information showing that whether an instruction set of a branch source and an instruction set of a branch destination are the same or not is indefinite. At the time of linking, the linking unit 130 appropriately generates, using the generated indefinite branch information, a branch instruction for changing a currently selected instruction set or a branch instruction for maintaining a currently selected instruction set, according to whether the instruction sets of the branch source and the branch destination are the same or not. This enables a caller function to be compiled even when an instruction set of a callee function is indefinite. Further, even when a source program including a callee function is recompiled and consequently an instruction set of the callee function is changed, a source program including a caller function for calling the callee function is not required to be recompiled.

This can be specifically understood by comparing (a) the object programs shown in FIGS. 4A and 4B that are respectively obtained by compiling the caller function "f" using an HD instruction set and the callee function "g" using an HS instruction set, with (b) the object programs shown in FIGS. 8A and 8B that are respectively obtained by compiling the caller function "f" using an HD instruction set and the callee function "g" using an HS instruction set and then recompiling the callee function "g" using an HD instruction set. In this case, the object program obtained by recompiling the callee function "g" and the object program obtained by compiling the caller function "f" can be linked correctly without any changes being made in the object program obtained by compiling the function "f". The same applies to other combinations of instruction sets.

Also, the program conversion apparatus 100 operates, with one of instruction sets being determined as the reference instruction set. When an instruction set of an instruction placed at an external entry is not the reference instruction set, the compiling unit 110 adds a mode adjusting instruction and uses a placement location of the mode adjusting instruction as an alternative entry corresponding to the external entry that is the original branch destination.

For an indirect branch procedure, the compiling unit 110 generates a branch instruction for causing an indirect branch to an alternative entry corresponding to the original branch destination and for selecting the reference instruction set, instead of generating the indefinite branch information. As described above, the indirect branch to the alternative entry is realized by loading an address of the alternative entry instead of the original entry onto a register, when an address of a branch destination is to be loaded onto the register.

Due to this, a machine instruction for correctly selecting an instruction set can be generated even when a branch instruction using indirect addressing is used.

<Other Modifications>

Although the present invention is described based on the above embodiment, it should be clear that the present invention is not limited to the above specific embodiment. The following modifications are within the scope of the present invention.

(1) The present invention may be realized by a method including the steps described in the above embodiment. Also, the method may be realized by a computer program that can be executed using a computer system, or may be realized by a digital signal representing the program.

Also, the present invention may be realized by a computer-readable recording medium on which the program or the digital signal is recorded. Examples of the computer-readable recording medium include a flexible disk, a hard disk, a CD, an MO, a DVD, and a semiconductor memory.

Also, the present invention may be realized by the computer program or the digital signal transmitted via a telephone communication line, a radio or cable communication line, or a network such as the Internet.

Also, the program and the digital signal may be transferred as being recorded on the recording medium, or via the network and the like, and may be executed in another independent computer system.

(2) The branch-information generating unit 119 may generate, for a function call that is executed at the end of a caller function, a pseudo branch instruction "brx" that instructs to generate a branch instruction without recording a return address.

FIGS. 11A and 11B show examples of source programs in such a case. The function "g" is called at the end of the function "f".

Figure 12A:
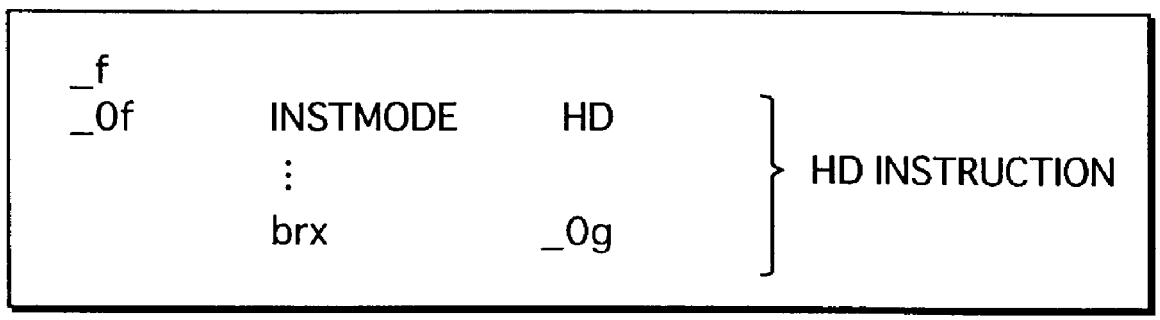
FIGS. 12A and 12B schematically show object programs.
Figure 12B:
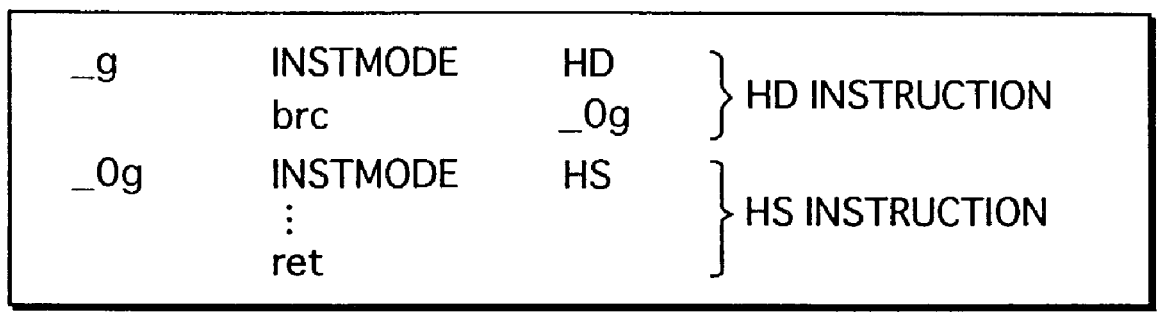

FIGS. 12A and 12B show object programs obtained by compiling the source programs shown in FIGS. 11A and 11B. From a function "g" call, a pseudo branch instruction "brx" that instructs to generate a branch instruction without recording a return address is generated. In an executable program (not shown) obtained by linking these object programs based on the pseudo branch instruction "brx", a branch-with-mode-change instruction "brc" without recording a return address is generated. Therefore, a "ret" instruction placed at the end of the object program shown in FIG. 12B causes a direct return to a location at which the object program in FIG. 12A is called, without via a machine instruction included in the object program shown in FIG. 12A.

(3) The processor targeted by the program conversion apparatus 100 may have n (3≦n) instruction sets.

FIG. 13 shows examples of branch instructions to be executed by the processor having n instruction sets. An "instruction" field 291 stores a mnemonic representing a branch instruction, an "operand" field 292 stores an operand that can be included in the branch instruction, and a "feature" field 293 stores a feature of the branch instruction. These branch instructions can be included in all the n instruction sets. As shown in the "feature" field 293, each of these branch instructions is for selecting an instruction set.

FIGS. 14A and 14B show, using an assembler notation, machine instruction sequences obtained by compiling the source programs shown in FIGS. 15A and 15B respectively using a "MODE1" instruction set and a "MODEn" instruction set, with the "MODE1" instruction set being determined as the reference instruction set.

In this case, too, the program conversion apparatus 100 generates, for a branch using direct addressing, a branch instruction for selecting an appropriate instruction set at the time of linking, and for a branch using indirect addressing, a branch instruction for causing a branch to an original entry via an alternative entry at which a mode adjusting instruction that belongs to the reference instruction set is placed, in the same manner as described above, thereby producing the same effects as in the case of the above embodiment.

(4) Although the above embodiment describes the case where the branch-instruction generating unit 131 generates a branch instruction at a predetermined location in a machine instruction sequence included in an object program, the branch-instruction generating unit 131 may generate the branch instruction at the corresponding location in an executable program generated by linking the object programs.

(5) The indefinite branch information maybe in any forms other than the above-described indefinite branch information table as long as the indefinite-branch information can show a location at which a branch instruction is to be placed and show that an instruction set to which a branch destination instruction of the branch instruction belongs is indefinite.

For example, an operation code that is different from any of instructions included in an instruction set may be provided. In this case, the compiling unit 110 may handle the operation code and the instructions in the same manner, so as to include the operation code into a machine instruction sequence. The linking unit 130 may replace the operation code with an appropriate branch instruction.

Also, it may be agreed between the compiling unit 110 and the linking unit 130 that a predetermined branch instruction included in an instruction set represents indefinite branch information. In this case, the linking unit 130 may replace each predetermined branch instruction included in a machine instruction with an appropriate branch instruction.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A program conversion apparatus compiling a first source program that describes an external entry into a first machine instruction sequence and a second source program that describes a branch procedure to the external entry into a second machine instruction sequence, and linking a plurality of machine instruction sequences including the first and second machine instruction sequences, to generate an executable program, each of the first and second machine instruction sequences being composed of one or more machine instructions that each belong to one of the instruction sets, the program conversion apparatus comprising:
a memory storing
(i) a compiler that includes
a first-instruction-set-information generating unit operable to generate first-instruction-set-information when the first source program is compiled, the first-instruction-set-information showing an instruction set to which a machine instruction for executing a procedure described at the external entry belongs, and
an indefinite-branch-information generating unit operable to generate indefinite-branch-information when the second source program is compiled, the indefinite-branch-information showing a location at which a branch instruction for executing the branch procedure is to be placed, and showing that an instruction set to which a machine instruction placed at the external entry belongs is indefinite; and
(ii) a linker that includes
a branch instruction generating unit operable to generate the branch instruction for executing the branch procedure, using a branch-with-mode-change instruction for making the processor select the instruction set shown by the first-instruction-set-information, at the location shown by the indefinite-branch-information, when the plurality of machine instruction sequences are linked, and links a plurality of machine instruction sequences to the executable program, using the branch instruction; and
a processor operable to execute the compiler and the linker that dynamically selects one of a plurality of instruction sets by executing a branch-with-mode-change instruction and interprets and executes a machine instruction according to the selected instruction set.

2. A program conversion apparatus according to claim 1, wherein,
the compiler further includes
a second-instruction-set-information generating unit operable to generate second-instruction-set-information when the second source program is compiled, the second-instruction-set-information showing an instruction set to which the branch instruction for executing the branch procedure is to belong,
wherein the branch instruction generating unit
(a) generates the branch instruction for executing the branch procedure, using the branch-with-mode-change instruction only in a case where the instruction set shown by the first-instruction-set-information and the instruction set shown by the second-instruction-set-information are different, and
(b) generates the branch instruction for executing the branch procedure, using a branch-without-mode-change instruction for making the processor maintain a currently selected instruction set, in the other cases.

3. A program conversion apparatus according to claim 1, operating with one of the plurality of instruction sets being determined as a reference instruction set, wherein,
the compiler further includes
a mode-adjusting-instruction adding unit operable to add a mode adjusting instruction to the first machine instruction sequence when the first source program is compiled, the mode adjusting instruction being a branch-with-mode-change instruction that is for causing a branch to the external entry and for making the processor select the instruction set shown by the first-instruction-set-information, and that belongs to the reference instruction set, wherein the indefinite-branch-information generating unit includes:

a branch-information generating subunit operable to generate the indefinite-branch-information, only when the branch instruction for executing the branch procedure is to use direct addressing; and an indirect-branch-instruction generating subunit operable to generate the branch instruction for executing the branch procedure, using a branch-with-mode-change instruction for causing an indirect branch to the added mode adjusting instruction and for making the processor select the reference instruction set, only when the branch instruction for executing the branch procedure is to use indirect addressing.

4. A program conversion apparatus according to claim 3, wherein the mode-adjusting-instruction adding unit adds the mode adjusting instruction, only when the instruction set shown by the first-instruction-set-information is not the reference instruction set, and the indirect-branch-instruction generating subunit generates the branch instruction for executing the branch procedure, using a branch-with-mode-change instruction for causing an indirect branch to the external entry, only when the mode adjusting instruction is not added.

5. A program conversion apparatus according to claim 3, wherein:

the compiler further includes:

an indirect branch judging unit operable to judge whether an indirect branch to the added mode adjusting instruction is to be caused or not at a time of execution of the executable program, based on a predetermined criterion; and a mode-adjusting-instruction deleting unit operable to delete the added mode adjusting instruction, when the indirect branch judging unit judges that the indirect branch is not caused.

6. A program conversion apparatus according to claim 5, wherein the indirect branch judging unit judges that the indirect branch is not caused, when an indirect branch instruction is not included in any of the plurality of machine instruction sequences to be linked to generate the executable program.

7. A program conversion apparatus according to claim 5, wherein the indirect branch judging unit judges that the indirect branch is not caused, when an instruction referring to the added mode adjusting instruction is not included in any of the plurality of machine instruction sequences to be linked to generate the executable program.

8. A program conversion apparatus according to claim 1, wherein the branch procedure is a function call, the indefinite-branch-information generating unit further generates (a) branch instruction classification information showing that the branch instruction for executing the branch procedure is to be generated using a branch instruction without recording a return address, when the function call is to be executed at an end of a caller function, and (b) branch instruction classification information showing that the branch instruction for executing the branch procedure is to be generated using a branch instruction with recording a return address, when the function call is to be executed at a location other than the end of the caller function, and the branch instruction generating unit generates the branch instruction for executing the branch procedure, according to the generated branch instruction classification information.

9. A program conversion apparatus according to claim 1, wherein, the compiler further includes a sorting unit operable to sort machine instructions included in each of the plurality of machine instruction sequences to be linked, according to the plurality of instruction sets, and place the machine instructions in such a manner that machine instructions that belong to a same instruction set are arranged consecutively.

10. A program conversion apparatus according to claim 1, wherein, the compiler further includes an instruction-set determining unit operable to determine an instruction set to which machine instructions generated by compiling the first source program belong, based on at least one of (a) a pragma instruction described in the first source program and (b) a compiler option made when the first source program is compiled, wherein the first-instruction-set-information generating unit generates the first-instruction-set-information according to a determination made by the instruction-set determining unit.

11. A program conversion method targeting a processor that includes a compiler and a linker for compiling a first source program that describes an external entry into a first machine instruction sequence and a second source program that describes a branch procedure to the external entry into a second machine instruction sequence, and linking a plurality of machine instruction sequences including the first and second machine instruction sequences, to generate an executable program, each of the first and second machine instruction sequences being composed of one or more machine instructions that each belong to one of the instruction sets, the program conversion method comprising:

a first-instruction-set-information generating step, performed by the compiler, of generating first-instruction-set-information when the first source program is compiled, the first-instruction-set-information showing an instruction set to which a machine instruction for executing a procedure described at the external entry belongs;

an-indefinite-branch-information generating step, performed by the compiler, of generating indefinite-branch-information when the second source program is compiled, the indefinite-branch-information showing a location at which a branch instruction for executing the branch procedure is to be placed, and showing that an instruction set to which a machine instruction placed at the external entry belongs is indefinite;

a branch instruction generating step, performed by the linker, of generating the branch instruction for executing the branch procedure, by using a branch-with-mode-change instruction for making the processor select the instruction set shown by the first-instruction-set-information, at the location shown by the indefinite-branch-information, when the plurality of machine instruction sequences are linked; and a processing step of dynamically selecting one of a plurality of instruction sets by executing a branch-with-mode-change instruction and interpreting and executing a machine instruction according to the selected instruction set.

12. A program conversion method according to claim 11, executed with one of the plurality of instruction sets being determined as a reference instruction set, the program conversion method further comprising, a mode-adjusting-instruction adding step, performed by the compiler, of adding a mode adjusting instruction to the first machine instruction sequence when the first source program is compiled, the mode adjusting instruction being a branch-with-mode-change instruction that is for causing a branch to the external entry and for making the processor select the instruction set shown by the first-instruction-set-information, and that belongs to the reference instruction set, wherein the indefinite-branch-information generating step includes:

a branch-information generating substep of generating the indefinite-branch-information, only when the branch instruction for executing the branch procedure is to use direct addressing; and an indirect-branch-instruction generating substep of generating the branch instruction for executing the branch procedure, by using a branch-with-mode-change instruction for causing an indirect branch to the added mode adjusting instruction and for making the processor select the reference instruction set, only when the branch instruction for executing the branch procedure is to use indirect addressing.

13. A computer-readable medium storing therein a computer program for executing, using a computer, a program conversion process targeting a processor for compiling a first source program that describes an external entry into a first machine instruction sequence and a second source program that describes a branch procedure to the external entry into a second machine instruction sequence, and linking a plurality of machine instruction sequences including the first and second machine instruction sequences, to generate an executable program, each of the first and second machine instruction sequences being composed of one or more machine instructions that each belong to one of the instruction sets, the computer program comprising:

a first-instruction-set-information generating step, performed by the compiler, of generating first-instruction-set-information when the first source program is compiled, the first-instruction-set-information showing an instruction set to which a machine instruction for executing a procedure described at the external entry belongs; an indefinite-branch-information generating step, performed by the compiler, of generating indefinite-branch-information when the second source program is compiled, the indefinite-branch-information showing a location at which a branch instruction for executing the branch procedure is to be placed, and showing that an instruction set to which a machine instruction placed at the external entry belongs is indefinite;

a branch instruction generating step, performed by the linker, of generating the branch instruction for executing the branch procedure, by using a branch-with-mode-change instruction for making the processor select the instruction set shown by the first-instruction-set-information, at the location shown by the indefinite-branch-information, when the plurality of machine instruction sequences are linked; and a processing step of dynamically selecting one of a plurality of instruction sets by executing a branch-with-mode-change instruction and interpreting and executing a machine instruction according to the selected instruction set.

14. A computer program according to claim 13, operating with one of the plurality of instruction sets being determined as a reference instruction set, the computer program further comprising, a mode-adjusting-instruction adding step, performed by the compiler, of adding a mode adjusting instruction to the first machine instruction sequence when the first source program is compiled, the mode adjusting instruction being a branch-with-mode-change instruction that is for causing a branch to the external entry and for making the processor select the instruction set shown by the first-instruction-set-information, and that belongs to the reference instruction set, wherein the indefinite-branch-information generating step includes:

a branch-information generating substep of generating the indefinite-branch-information, only when the branch instruction for executing the branch procedure is to use direct addressing; and an indirect-branch-instruction generating substep of generating the branch instruction for executing the branch procedure, by using a branch-with-mode-change instruction for causing an indirect branch to the added mode adjusting instruction and for making the processor select the reference instruction set, only when the branch instruction for executing the branch procedure is to use indirect addressing.

15. A program conversion apparatus that generates object code modules comprising:

a memory storing
  (i) a compiling unit that includes:
    a machine-instruction-sequence generating unit that generates object code, an instruction-set-information generating unit that generates entry point information for the object code,
    a branch-information-generating unit that associates pseudo branch instructions in an assembler program with machine code addresses to generate an indefinite branch table showing that an instruction set to which a machine instruction placed at a branch destination belongs is indefinite, and
    an indefinite-branch-information generating unit operable to generate indefinite-branch-information when a source program is compiled, the indefinite-branch-information showing a location at which a branch instruction for executing the branch procedure is to be placed, and showing that an instruction set to which a machine instruction placed at the external entry belongs is indefinite; and
  (ii) a linking unit that links object code generated by the machine-instruction-sequence generating unit, the linking unit having a branch-instruction generating unit that generates branch instructions using entry point information generated by the instruction-set-generating unit and the indefinite branch table generated by the branch-information-generating unit; and a processor operable to execute the compiling unit and the linking unit by selecting one of a plurality of instruction sets, executing a branch-with-mode-change instruction, and interpreting and executing a machine instruction according to the selected instruction set.

16. The program conversion apparatus of claim 15 wherein the branch instruction generating unit branch instructions generates a microprocessor change mode instruction.

17. The program conversion apparatus of claim 16 wherein the change mode instruction is a high speed or high density mode instruction.

18. The program conversion apparatus of claim 15 wherein the compiler generates object code from C language source code.

19. The program conversion apparatus of claim 18 wherein the pseudo branch instructions include a pragma statement.

20. A computer based method for compiling and linking machine code, comprising the steps of:

compiling a first source program into a first machine code instruction sequence;

associated with the first machine code sequence;

compiling a second source program into a second machine code instruction sequence;

generating indefinite-branch-information associated with a branching instruction in the second machine code instruction sequence when the second source program is compiled, the indefinite-branch-information showing a location at which a branch instruction for executing the branch procedure is to be placed, and showing that an instruction set to which a machine instruction placed at the external entry belongs is indefinite; and linking the first machine code instruction sequence to the second machine code instruction sequence by inserting a branch-with-mode-change instruction between the first machine code instruction sequence and the second machine code instruction sequence when the branch instruction information and the external entry information show that a mode change is needed.

* * * * *